(12) United States Patent
Ovadia et al.

(10) Patent No.: US 7,526,202 B2
(45) Date of Patent: Apr. 28, 2009

(54) ARCHITECTURE AND METHOD FOR FRAMING OPTICAL CONTROL AND DATA BURSTS WITHIN OPTICAL TRANSPORT UNIT STRUCTURES IN PHOTONIC BURST-SWITCHED NETWORKS

(75) Inventors: Shlomo Ovadia, San Jose, CA (US); Christian Maciocco, Tigard, CA (US)

(73) Assignee: Intel Corporation, Santa Clara, CA (US)

(*) Notice: Subject to any disclaimer, the term of this patent is extended or adjusted under 35 U.S.C. 154(b) by 1032 days.

(21) Appl. No.: 10/441,771

(22) Filed: May 19, 2003

(65) Prior Publication Data
US 2004/0234263 A1   Nov. 25, 2004

(51) Int. Cl.
*H04J 14/00*   (2006.01)
*H04Q 11/04*   (2006.01)
*H04L 12/28*   (2006.01)

(52) U.S. Cl. .......................................... 398/51; 398/45
(58) Field of Classification Search ................... 398/51, 398/45
See application file for complete search history.

(56) References Cited

U.S. PATENT DOCUMENTS

| | | | |
|---|---|---|---|
| 4,663,748 A | 5/1987 | Karbowiak et al. | |
| 5,235,592 A * | 8/1993 | Cheng et al. ................. | 370/451 |
| 5,331,642 A | 7/1994 | Valley et al. | |
| 5,457,556 A | 10/1995 | Shiragaki | |
| 5,506,712 A | 4/1996 | Sasayama et al. | |
| 5,550,803 A * | 8/1996 | Crayford et al. ............. | 370/246 |
| 5,559,796 A * | 9/1996 | Edem et al. .................. | 370/412 |
| 5,646,943 A | 7/1997 | Elwalid | |
| 5,768,274 A | 6/1998 | Murakami et al. | |
| 5,838,663 A | 11/1998 | Elwalid et al. | |

(Continued)

FOREIGN PATENT DOCUMENTS

CN   1384618   12/2002

(Continued)

OTHER PUBLICATIONS

Henderson, Michael. "Forward Error Correction in Optical Network", Mar. 27, 2001. http://members.cox.net/michael.henderson/Papers/Optical_FEC.pdf.*

(Continued)

*Primary Examiner*—Kenneth N Vanderpuye
*Assistant Examiner*—Danny W Leung
(74) *Attorney, Agent, or Firm*—Blakely, Sokoloff, Taylor & Zafman LLP

(57) ABSTRACT

An optical network, which includes edge and switching nodes, optically communicate information formatted into bursts that are included in one or more optical channel transport unit (OTU) frames that are based on ITU-T recommendation G.709. The overhead portion of the OTU frame can include all of the fields defined in the G.709 standard, except that the two reserved bits are used to define an OTU frame type. When the FEC function is not used, the OTU frame can be arbitrarily partitioned to carry optical burst information. The information can be either control and/or data bursts or metadata related to the optical network and/or optical burst flow. When the FEC function is used, the OTU frame is used to include optical control or data bursts or optical metadata in the payload portion of the G.709 OTU frame.

56 Claims, 16 Drawing Sheets

U.S. PATENT DOCUMENTS

| | | | |
|---|---|---|---|
| 5,970,050 A | 10/1999 | Johnson | |
| 5,978,356 A | 11/1999 | Elwalid et al. | |
| 6,111,673 A | 8/2000 | Chang et al. | |
| 6,222,839 B1 | 4/2001 | Nakazaki et al. | |
| 6,222,841 B1* | 4/2001 | Taniguchi | 370/389 |
| 6,260,155 B1 | 7/2001 | Dellacona | |
| 6,271,946 B1 | 8/2001 | Chang et al. | |
| 6,272,117 B1* | 8/2001 | Choi et al. | 370/330 |
| 6,325,636 B1 | 12/2001 | Hipp et al. | |
| 6,339,488 B1 | 1/2002 | Beshai et al. | |
| 6,400,863 B1 | 6/2002 | Weinstock et al. | |
| 6,411,506 B1 | 6/2002 | Hipp et al. | |
| 6,466,586 B1* | 10/2002 | Darveau et al. | 370/468 |
| 6,487,686 B1 | 11/2002 | Yamazaki et al. | |
| 6,490,292 B1 | 12/2002 | Matsuzawa | |
| 6,498,667 B1* | 12/2002 | Masucci et al. | 398/98 |
| 6,519,062 B1 | 2/2003 | Yoo | |
| 6,519,255 B1 | 2/2003 | Graves | |
| 6,525,850 B1 | 2/2003 | Chang et al. | |
| 6,542,499 B1 | 4/2003 | Murphy et al. | |
| 6,545,781 B1 | 4/2003 | Chang et al. | |
| 6,603,893 B1 | 8/2003 | Liu et al. | |
| 6,615,382 B1* | 9/2003 | Kang et al. | 714/748 |
| 6,665,495 B1 | 12/2003 | Miles et al. | |
| 6,671,256 B1 | 12/2003 | Xiong et al. | |
| 6,674,558 B1 | 1/2004 | Chang et al. | |
| 6,690,036 B2 | 2/2004 | Liu et al. | |
| 6,697,374 B1 | 2/2004 | Shraga et al. | |
| 6,721,271 B1 | 4/2004 | Beshai et al. | |
| 6,721,315 B1* | 4/2004 | Xiong et al. | 370/389 |
| 6,839,322 B1 | 1/2005 | Smith | |
| 6,842,424 B1 | 1/2005 | Key et al. | |
| 6,873,797 B2 | 3/2005 | Chang et al. | |
| 6,898,205 B1 | 5/2005 | Chaskar et al. | |
| 6,925,257 B2 | 8/2005 | Yoo | |
| 6,940,863 B2 | 9/2005 | Xue et al. | |
| 6,956,868 B2 | 10/2005 | Qiao | |
| 6,987,770 B1* | 1/2006 | Yonge, III | 370/401 |
| 6,990,071 B2 | 1/2006 | Adam et al. | |
| 7,023,846 B1 | 4/2006 | Andersson et al. | |
| 7,035,537 B2 | 4/2006 | Wang et al. | |
| 7,092,633 B2 | 8/2006 | Fumagalli et al. | |
| 7,106,968 B2 | 9/2006 | Lahav et al. | |
| 2002/0018263 A1 | 2/2002 | Ge et al. | |
| 2002/0018468 A1 | 2/2002 | Nishihara | |
| 2002/0023249 A1 | 2/2002 | Temullo et al. | |
| 2002/0024700 A1 | 2/2002 | Yokoyama et al. | |
| 2002/0063924 A1 | 5/2002 | Kimbrough et al. | |
| 2002/0109878 A1 | 8/2002 | Qiao | |
| 2002/0118419 A1 | 8/2002 | Zheng et al. | |
| 2002/0126337 A1* | 9/2002 | Uematsu et al. | 359/110 |
| 2002/0141400 A1 | 10/2002 | DeMartino | |
| 2002/0150099 A1 | 10/2002 | Pung et al. | |
| 2002/0154360 A1 | 10/2002 | Liu | |
| 2002/0159114 A1 | 10/2002 | Sahasrabuddhe et al. | |
| 2002/0186433 A1 | 12/2002 | Mishra | |
| 2002/0186695 A1 | 12/2002 | Schwartz et al. | |
| 2002/0196808 A1 | 12/2002 | Karri et al. | |
| 2003/0002499 A1 | 1/2003 | Cummings et al. | |
| 2003/0009582 A1 | 1/2003 | Qiao et al. | |
| 2003/0016411 A1* | 1/2003 | Zhou et al. | 359/110 |
| 2003/0031198 A1 | 2/2003 | Currivan et al. | |
| 2003/0037297 A1* | 2/2003 | Araki | 714/746 |
| 2003/0039007 A1 | 2/2003 | Ramadas et al. | |
| 2003/0043430 A1 | 3/2003 | Handelman | |
| 2003/0048506 A1 | 3/2003 | Handelman | |
| 2003/0053475 A1 | 3/2003 | Veeraraghavan et al. | |
| 2003/0067880 A1 | 4/2003 | Chiruvolu | |
| 2003/0099243 A1 | 5/2003 | Oh et al. | |
| 2003/0120799 A1* | 6/2003 | Lahav et al. | 709/236 |
| 2003/0189933 A1 | 10/2003 | Ozugur et al. | |
| 2003/0198471 A1 | 10/2003 | Ovadia | |
| 2003/0214979 A1 | 11/2003 | Kang et al. | |
| 2004/0004966 A1 | 1/2004 | Foster et al. | |
| 2004/0052525 A1 | 3/2004 | Ovadia | |
| 2004/0062263 A1* | 4/2004 | Charcranoon et al. | 370/431 |
| 2004/0120261 A1 | 6/2004 | Ovadia | |
| 2004/0131061 A1* | 7/2004 | Matsuoka et al. | 370/392 |
| 2004/0156325 A1* | 8/2004 | Perkins et al. | 370/299 |
| 2004/0156390 A1* | 8/2004 | Prasad et al. | 370/466 |
| 2004/0170165 A1 | 9/2004 | Maciocco et al. | |
| 2004/0170431 A1 | 9/2004 | Maciocco et al. | |
| 2004/0208171 A1 | 10/2004 | Ovadia et al. | |
| 2004/0208172 A1 | 10/2004 | Ovadia et al. | |
| 2004/0208544 A1 | 10/2004 | Ovadia | |
| 2004/0208554 A1 | 10/2004 | Wakai et al. | |
| 2004/0234263 A1 | 11/2004 | Ovadia et al. | |
| 2004/0252995 A1 | 12/2004 | Ovadia et al. | |
| 2004/0258407 A1 | 12/2004 | Maciocco et al. | |
| 2004/0264960 A1 | 12/2004 | Maciocco et al. | |
| 2005/0030951 A1 | 2/2005 | Maciocco et al. | |
| 2005/0063701 A1 | 3/2005 | Ovadia et al. | |
| 2005/0068968 A1 | 3/2005 | Ovadia et al. | |
| 2005/0068995 A1* | 3/2005 | Lahav et al. | 370/539 |
| 2005/0089327 A1 | 4/2005 | Ovadia et al. | |
| 2005/0105905 A1 | 5/2005 | Ovadia et al. | |
| 2005/0152349 A1* | 7/2005 | Takeuchi et al. | 370/373 |
| 2005/0175183 A1 | 8/2005 | Ovadia et al. | |
| 2005/0175341 A1 | 8/2005 | Ovadia | |
| 2005/0177749 A1 | 8/2005 | Ovadia | |
| 2005/0259571 A1 | 11/2005 | Battou | |
| 2006/0008273 A1* | 1/2006 | Xue et al. | 398/51 |

FOREIGN PATENT DOCUMENTS

| | | |
|---|---|---|
| CN | 1406000 | 3/2003 |
| CN | 1426189 | 6/2003 |
| EP | 0876076 | 11/1998 |
| EP | 1073306 A | 1/2001 |
| EP | 1073307 | 1/2001 |
| EP | 1089498 | 4/2001 |
| EP | 1122971 | 8/2001 |
| EP | 1135000 | 9/2001 |
| EP | 1217862 | 6/2002 |
| EP | 1303111 | 4/2003 |
| WO | WO 01/19006 | 3/2001 |
| WO | WO 01/67694 | 9/2001 |
| WO | WO 01/76160 A | 10/2001 |
| WO | WO 01/86998 A | 11/2001 |
| WO | WO 02/41663 | 5/2002 |
| WO | WO 02/067505 | 8/2002 |
| WO | PCT/US2004/014562 | 11/2004 |

OTHER PUBLICATIONS

Walch, Philip F., "FEC Standards and Long Haul STM-64 DWDM Transmission," Contribution to T1 Standards Project T1X1.5, Jan. 17, 2000, pp. 1-4.

"Interfaces for the Optical Transport Network (OTN)," ITU-T G.709/Y.1331, Mar. 2003, pp. 1-109.

Jacob et al., "Delay Performance of Some Scheduling Strategies in an Input Queuing ATM with Multiclass Bursty Traffic," IEEE/ACM Transactions on Networking, vol. 4, No. 2, Apr. 1996, pp. 258-271.

Yoo et al., "Optical Burst Switching for Service differentiation in the Next-Generation Optical Internet," IEEE, Feb. 2001, pp. 98-104.

Guillemot et al., "Transparent Optical Packet Switching: The European ACTS KEOPS Project Approach," IEEE 1998, Journal of Lightwave Technology, vol. 16, No. 12, Dec. 1998, pp. 2117-2126.

Gambini et al., "Transparent Optical Packet Switching: Network Architecture and Demonstrators in the KEOPS Project," IEEE Journal of Selected Areas in Communications, vol. 16, No. 7, Sep. 1998, pp. 1245-1259.

Mehorta, Pronita, et al., "Network Processor Design for Optical Burst Switched Networks," Proceedings of the 14th Annual IEEE International ASIC/SOC Conference, Sep. 12-15, 2001, pp. 296-300.

Ovadia, Shlomo et al., "Photonic Burst Switching (PBS) Architecture for Hop and Span-Constrained Optical Networks," IEEE Optical Communications, vol. 41, No. 11, Nov. 2003, pp. S24-S32.

Floyd, Sally et al.., "Modifying TCP'S TCP'S Congestion Control for High Speeds", pp. 1-5, May 5, 2002.

Zeljkovic, Nada et al., "A Simulation Analysis of Statistical Multiplexing in Frame Relay and ATM Interworking", Telsiks 2001, Sep. 19-21, 2001, 2001 IEEE, pp. 116-119.

Kumaran, Krishnan et al., "Multiplexing Regulated Traffic Streams: Design and Performance", Bell Laboratories/Lucent Technologies, IEEE Infocom 2001, pp. 527-536.

Brown, Timothy X., "Adaptive Statistical Multiplexing for Broadband Communitcation", Performance Evaluation and Application of ATM Networks, Kouvatsos, D. editor, Kluwer, 2000.

O'Mahony, Mike J. et al., "The Application of Optical Packet Switching in Future Communication Networks", IEEE Communications Magazine, Mar. 2001, pp. 128-135.

Yao, Shun et al., "All-Optical Packet Switching for Metropolitan Area Networks: Opportunities and Challenges", IEEE Communications Magazine, Mar. 2001, pp. 142-148.

Qiao, Chunming "Labeled Optical Burst Switching for IP-over-WDM Integration", IEEE Communications Magazine, Sep. 2000, pp. 104-114.

Carena, A. et al., "OPERA: An Optical Packet Experimental Routing Architecture with Label Swapping Capability", Journal of Lightwave Technology, vol. 16, No. 12, Dec. 1998, pp. 2135-2145.

Zhong, Wen De, "A New Wavelength-Routed Photonic Packet Buffer Combining Traveling Delay Lines with Delay-Line Loops", Journal of Lightwave Technology, vol. 19, No. 8, Aug. 2001, pp. 1085-1092.

Wiesmann, D. et al., "Apodized Surface-Corrugated Gratings with Varying Duty Cycles", IEEE Photonics Technology Letter, vol. 12, No. 6, Jun. 2000, pp. 639-640.

Hill, Kenneth O. et al., "Fiber Bragg Grating Technology Fundamentals and Overview", Journal of Lightwave Technology, vol. 15, No. 8, Aug. 1997, pp. 1263-1276.

Erdogan, Turan, "Fiber Grating Spectra", Journal of Lightwave Technology, vol. 15, No. 8, Aug. 1997, pp. 1277-1294.

Sugden, K. et al., "Fabrication and Characterization of Bandpass Filters Based on Concatenated Chirped Faber Gratings", Journal of Lightwave Technology, vol. 15, No. 8, Aug. 1997, pp. 1424-1432.

Giles, C.R., "Lightwave Applications of Fiber Bragg Gratings", Journal of Lightwave Technology, vol. 15, No. 8, Aug. 1997, pp. 1391-1404.

Willner, A. E. et al., "Tunable Compensation of Channel Degrading Effects Using Nonlinearly Chirped Passive Fiber Bragg Gratings", IEEE Journal of Selected Topics in Quantum Electronics, vol. 5, No. 5 Sep./Oct. 1999, pp. 1298-1311.

Studenkov, P. V. et al., "Asymmetric Twin-Waveguide 1.55 μm Wavelength Laser with a Distributed Bragg Reflector", IEEE Photonics Technology Letters, vol. 12, No. 5, May 2000, pp. 468-470.

Shibata, Yasuo et al., "Coupling Coefficient Modulation of Waveguide Grating Using Sampled Grating", IEEE Photonics Technology Letters, vol. 6, No. 10, Oct. 1994, pp. 1222-1224.

Chaskar, H. et al., "Robust Transport of IP Traffic Over WDM Using Optical Burst Switching," Optical Networks Magazine, Jul./Aug. 2002, pp. 47-60.

Oh, Se-Yoon et al., "A Data Burst Assembly Algorithm in Optical Burst Switching Networks," ETRI Journal, vol. 24, No. 4, Aug. 2002, pp. 311-322, Electronics and Telecommunications Research Institute, Tejon, Korea.

IETF Networking Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Panel for Optical Networks: Early Implementation Experience," Proceedings of the SPIE, vol. 4872, Jul. 29, 2002, pp. 220-229, SPIE, Bellingham, VA, US.

Gallaher, Rick, "An Introduction to MPLS", Course Director for Global Knowledge and President of Telecommunications Technical Services, Inc., Sep. 10, 2001, pp. 1-7.

"Compare SANs to Alternate Technologies", Brocade, Retrieved on Feb. 26, 2003 from http://www.brocade.com/san/evaluate/compare_san.jsp.

Khattar, Ravi Kumar et al., "Introduction to Storage Area Network, SAN", International Technical Support Organization, Aug. 1999, www.redbooks.ibm.com.

Sahara, A. et al., "Demonstration of Optical Burst Data Switching Using Photonic MPLS Routers Operated by GMPLS Signaling," OFC 2003, vol. 1, pp. 220-222.

Qiao, C. et al., "Polymorphic Control for Cost-Effective Design of Optical Networks", European transactions on Telecommunications, vol. 11, No. 1, Jan.-Feb. 2000, pp. 17-26.

Baldine, I. et al., "Jumpstart: A Just-in-Time Signaling Architecture for WDM Burst-Switched Networks", IEEE Communications Magazine, Feb. 2002, pp. 82-89.

Comellas, J. et al., "Integrated IP/WDM Routing in GMPLS-Based Optical Networks", IEEE Network, Mar./Apr. 2003, pp. 22-27.

Cidon, I. et al., "Connection Establishment in High-Speed Networks", IEEE/ACM Transactions on Networking, No. 4, Aug. 1993, pp. 469-481.

Wei, Wei et al., "GMPLS-Based Hierarchical Optical Routing Switching Architecture", Proceedings of SPIE, vol. 4585, 2001, pp. 328-334.

Banerjee, A. et al., "Generalized Multiprotocol Label Switching: An Overview of Routing and Management Enhancements," IEEE Communications Magazine, Jan. 2001, pp. 144-150.

Kim, Y. et al., "Discrete Event Simulation of the DiffServ-over-MPLS with NIST GMPLS Lightwave Agile Switching Simulator (GLASS)," Joint Conference of Communication and Information -2002, Jeju, Korea, 4 pgs.

Henderson, Michael, "Forward Error Correction in Optical Network," Mar.27, 2001. http://members.cox.net/michaeo.henderson/Papers/Optical_FEC.pdf, pp. 1-18.

Cao, Xiaojun et al., "Assembling TCP/IP Packets in Optical Burst Switched Networks", IEEE Global Telecommunications Conference, 2002, pp. 2808-2812, vol. 1, New York.

Wang, S.Y., "Using TCP Congestion Control to Improve the Performance of Optical Burst Switched Networks", IEEE International Conference on Communications, 2003, pp. 1438-1442, Taiwan.

Detti, Andrea et al., "Impact of Segments Aggregation on TCP Reno Flows in Optical Burst Switching Networks", IEEE Infocom, 2002, pp. 1803-1805, vol. 1, New York.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, pp. 17-31.

Rekhter, Y. et al., "A Border Gateway Protocol 4 (BGP-4)", Network Working Group, Mar. 1995, pp. 1-57.

Office Action mailed on Nov. 14, 2006. Ovadia et al., "Dynamic Route Discovery for Optical Switched Networks," U.S. Appl. No. 10/691,712, filed Oct. 22, 2003.

* cited by examiner

OPTICAL DATA BURST FORMAT

OPTICAL CONTROL BURST FORMAT

ARCHITECTURE AND METHOD FOR FRAMING OPTICAL CONTROL AND DATA BURSTS WITHIN OPTICAL TRANSPORT UNIT STRUCTURES IN PHOTONIC BURST-SWITCHED NETWORKS

CROSS REFERENCE TO RELATED APPLICATIONS

The present application is related to U.S. patent application Ser. No. 10/126,091, filed Apr. 17, 2002, U.S. patent application Ser. No. 10/183,111, filed Jun. 25, 2002, U.S. patent application Ser. No. 10/328,571, filed Dec. 24, 2002, U.S. patent application Ser. No. 10/377,312 filed Feb. 28, 2003, and U.S. patent application Ser. No. 10/377,580 filed Feb. 28, 2003.

FIELD OF THE INVENTION

An embodiment of the present invention relates to optical networks in general; and, more specifically, to framing of control and data bursts within optical transport unit structures in optical networks.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (O-E-O) conversion of optical signals be done at the optical switches. O-E-O conversion at each switching node in the optical network is not only very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large communication network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). The optical MANs and WANs typically require a higher bandwidth than local-area networks (LANs) in order to provide an adequate level of service demanded by their high-end users. However, as LAN speeds/bandwidth increase with improved technology, there is a need for increasing MAN/WAN speeds/bandwidth.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
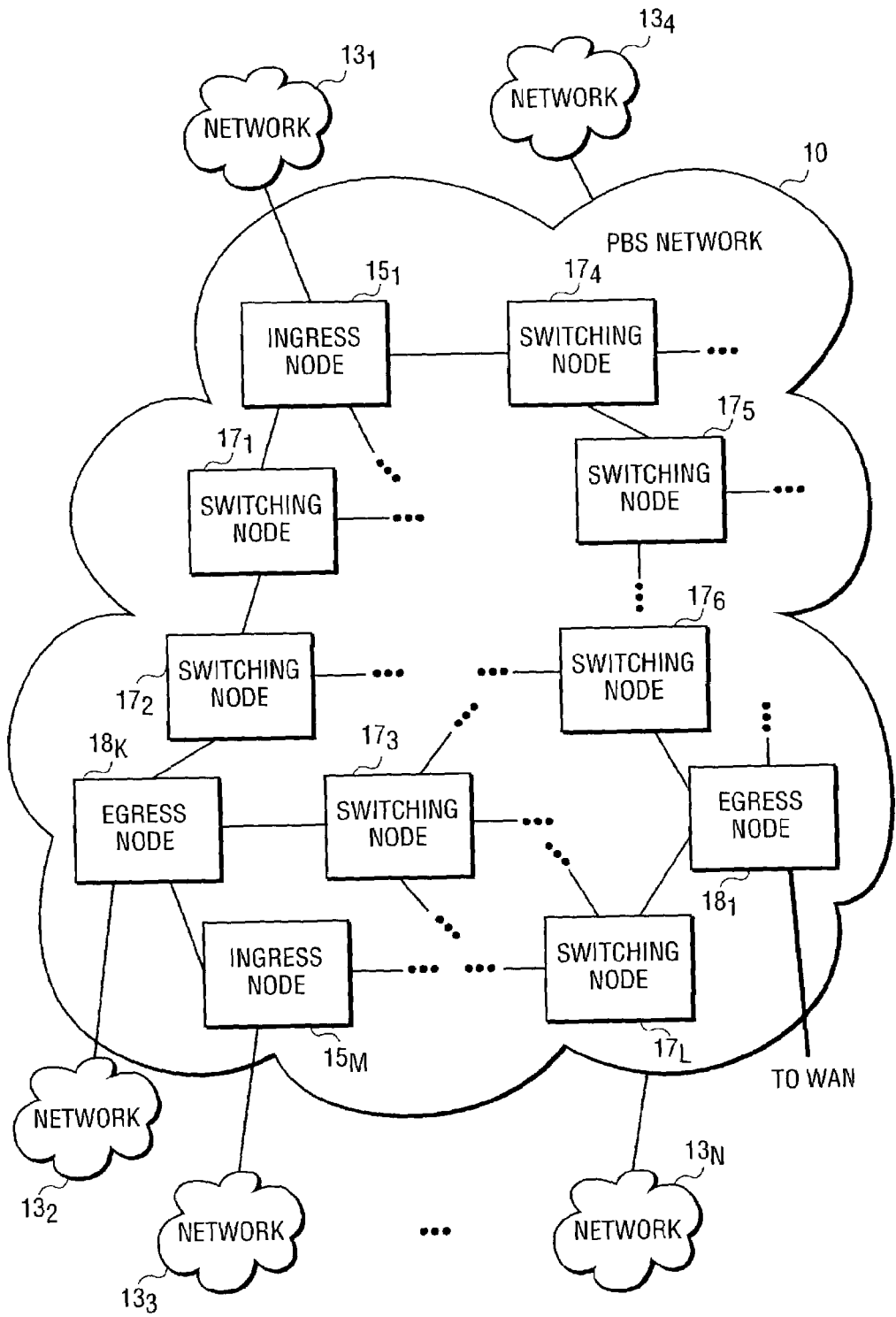
FIG. 1 is a simplified block diagram illustrating a photonic burst-switched (PBS) network, according to one embodiment of the present invention.

FIG. 1 illustrates a photonic burst-switched (PBS) network 10, according to one embodiment of the present invention. The term photonic burst is used herein to refer to statistically multiplexed packets (e.g., Internet protocol (IP) packets or Ethernet frames) having similar routing requirements). A photonic burst typically includes a photonic label including the header and other routing information of the IP packets and a payload including the data segments of the packets.

This embodiment of PBS network 10 is connected to external networks such as local area networks (LANs) $13_1$-$13_N$ and a backbone optical WAN (not shown). In addition, this embodiment of PBS network 10 includes ingress nodes $15_1$-$15_M$, switching nodes $17_1$-$17_L$, and egress nodes $18_1$-$18_K$. PBS network 10 can include other ingress, egress and switching nodes (not shown) that are interconnected with the switching nodes shown in FIG. 1. The ingress and egress nodes are also referred to herein as edge nodes in that they logically reside at the edge of the PBS network. The edge nodes, in effect, provide an interface between the aforementioned "external" networks (i.e., external to the PBS network) and the switching nodes of the PBS network. In this embodiment, the ingress, egress and switching nodes are implemented with intelligent modules. This embodiment can be used, for example, as a metropolitan area network connecting a large number of LANs within the metropolitan area to a large optical backbone network.

In some embodiments, the ingress nodes perform optical-electrical (O-E) conversion of received optical signals, and include electronic memory to buffer the received signals until they are sent to the appropriate LAN. In addition, in some embodiments, the ingress nodes also perform electrical-optical (E-O) conversion of the received electrical signals before they are transmitted to switching nodes $17_1$-$17_M$ of PBS network 10.

Egress nodes are implemented with optical switching units or modules that are configured to receive optical signals from other nodes of PBS network 10 and route them to the optical WAN or other external networks. Egress nodes can also receive optical signals from the optical WAN or other external network and send them to the appropriate node of PBS network 10. In one embodiment, egress node $18_1$ performs O-E-O conversion of received optical signals, and includes electronic memory to buffer received signals until they are sent to the appropriate node of PBS network 10 (or to the optical WAN).

Switching nodes $17_1$-$17_L$ are implemented with optical switching units or modules that are each configured to receive optical signals from other switching nodes and appropriately route the received optical signals to other switching nodes of PBS network 10. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical "data" bursts (as opposed to control bursts and network management control bursts) signals in such embodiments, even though the control bursts and network management control bursts may include necessary information for a particular group of optical data burst signals. The control and data burst information is transmitted on separate wavelengths in some embodiments, which is also referred to herein as out-of-band (OOB) signaling. In other embodiments, control and data information may be sent on the same wavelengths (also referred to herein as in-band signaling). In another embodiment, optical control bursts, network management control bursts, and optical data burst signals may be propagated on the same wavelength(s) using different encoding schemes such as different modulation formats, etc. In either approach, the optical control bursts and network management control bursts are sent asynchronously relative to its corresponding optical data burst signals. In still another embodiment, the optical control bursts and other control signals are propagated at different transmission rates as the optical data signals.

Although switching nodes $17_1$-$17_L$ may perform O-E-O conversion of the optical control signals, in this embodiment, the switching nodes do not perform O-E-O conversion of the optical data burst signals. Rather, switching nodes $17_1$-$17_L$ perform purely optical switching of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes. Embodiments of the switching nodes are described further below.

Elements of exemplary PBS network 10 are interconnected as follows. LANs $13_1$-$13_N$ (external of PBS network 10) are connected to corresponding ones of ingress nodes $15_1$-$15_M$ of PBS network 10. Within PBS network 10, ingress nodes $15_1$-$15_M$ and egress nodes $18_1$-$18_K$ are connected to some of switching nodes $17_1$-$17_L$ via optical fibers. Switching nodes $17_1$-$17_L$ are also interconnected to each other via optical fibers in mesh architecture to form a relatively large number of lightpaths or optical links between the ingress nodes, and between ingress nodes $15_1$-$15_L$ and egress nodes $18_1$-$18_K$. Ideally, there are more than one lightpath to connect the switching nodes $17_1$-$17_L$ to each of the endpoints of PBS network 10 (i.e., the ingress nodes and egress nodes are endpoints within PBS network 10). Multiple lightpaths between switching nodes, ingress nodes, and egress nodes enable protection switching when one or more node fails, or can enable features such as primary and secondary route to destination.

As described below in conjunction with FIG. 2, the ingress, egress and switching nodes of PBS network 10 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 10 can send optical control burst signals while sending data out of PBS network 10 (either optical or electrical).

Figure 2:
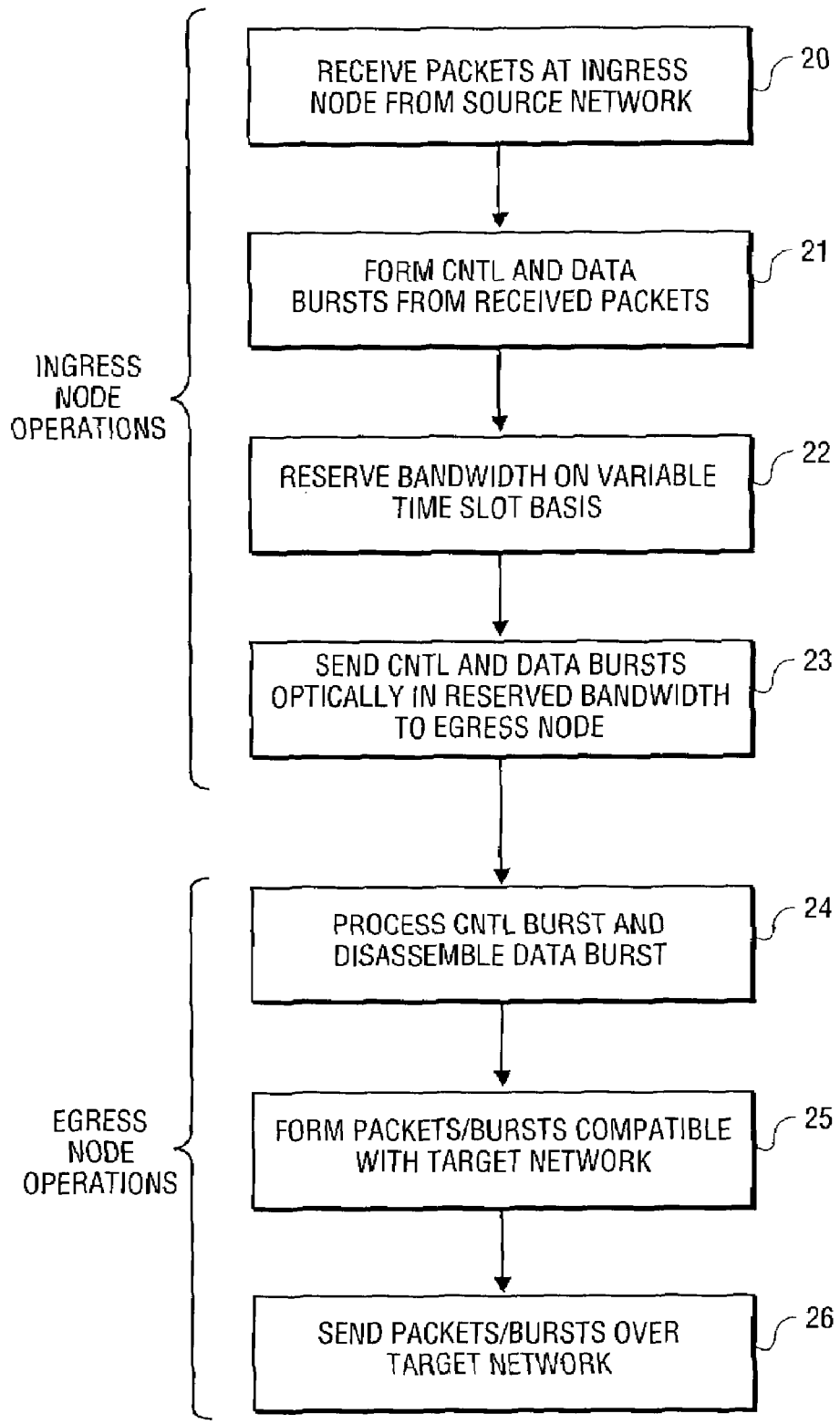
FIG. 2 is a simplified flow diagram illustrating the operation of a photonic burst-switched (PBS) network, according to one embodiment of the present invention.

FIG. 2 illustrates the operational flow of PBS network 10, according to one embodiment of the present invention. Referring to FIGS. 1 and 2, photonic burst switching network 10 operates as follows.

PBS network 10 receives packets from LANs $13_1$-$13_N$. In one embodiment, PBS network 10 receives IP packets at ingress nodes $15_1$-$15_M$. The received packets can be in electronic form rather than in optical form, or received in optical form and then converted to electronic form. In this embodiment, the ingress nodes store the received packets electronically. A block 20 represents this operation.

For clarity, the rest of the description of the operational flow of PBS network 10 focuses on the transport of information from ingress node $15_1$ to egress node $18_1$. The transport of information from ingress nodes $15_2$-$15_M$ to egress node $18_1$ (or other egress nodes) is substantially similar.

An optical burst label (i.e., an optical control burst) and optical payload (i.e., an optical data burst) is formed from the received packets. In one embodiment, ingress node $15_1$ uses statistical multiplexing techniques to form the optical data burst from the received IP (Internet Protocol) packets stored in ingress node $15_1$. For example, packets received by ingress node $15_1$ and having to pass through egress node $18_1$ on their paths to a destination can be assembled into an optical data burst payload. Statistical multiplexing generally refers to techniques for sharing a link or channel by multiple data sources based on statistics of the bandwidth used by the sources (e.g., an average) rather than the peak bandwidth required by each source. For example, statistical multiplexing techniques are disclosed by K. Kumaran and M. Mandjes, "Multiplexing Regulated Traffic Streams: Design and Performance" in Proc. of IEEE INFOCOM 2001; C.-F. Su and G. de Veciana, "On Statistical Multiplexing, Traffic Mixes, and VP Management" in Proc. of IEEE INFOCOM 1998; B. Maglaris, D. Anastassiou, P. Sen, G. Karlsson, and J. D. Robbins, "Performance Models of Statistical Multiplexing in Packet Video Communications," IEEE Transaction on Communications 36, 834-844, 1988, T. Brown, "Adaptive Statistical Multiplexing For Broadband Communication", Chapter 3, of "Performance Evaluation and Application of ATM Networks", Kouvatsos, D. editor, Kluwer, 2000. Other embodiments can use any suitable statistical multiplexing technique. A block 21 represents this operation.

Bandwidth on a specific optical channel and/or fiber is reserved to transport the optical data burst through PBS network 10. In one embodiment, ingress node $15_1$ reserves a time slot (i.e., a time slot of a TDM system) in an optical data signal path through PBS network 10. This time slot maybe fixed-time duration and/or variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the ingress, egress, and switching nodes maintain an updated list of all used and available time slots. The time slots can be allocated and distributed over multiple wavelengths and optical fibers. Thus, a reserved time slot (also referred to herein as a TDM channel), that in different embodiments may be of fixed-duration or variable-duration, may be in one wavelength of one fiber, and/or can be spread across multiple wavelengths and multiple optical fibers. A block 22 represents this operation.

When an ingress and/or egress node reserves bandwidth or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which are periodically broadcasted to all the ingress, switching, and egress nodes, are transmitted on the same wavelength as the optical control bursts or on a different common preselected wavelength throughout the optical network. The network controller function can reside in one of the ingress or egress nodes, or can be distributed across two or more ingress and/or egress nodes. In this embodiment, the network controller is part of control unit 37 (FIG. 3), which can include one or more processors.

The optical control bursts, network management control labels, and optical data bursts are then transported through photonic burst switched network 10 in the reserved time slot or TDM channel. In one embodiment, ingress node $15_1$ transmits the control burst to the next node along the optical label-switched path (OLSP) determined by the network controller. In this embodiment, the network controller uses a constraint-based routing protocol [e.g., generalized multi-protocol label switching (GMPLS) Draft Internet Engineering Task Force (IETF) Architecture-05 Internet-Draft, March 2003] over one or more wavelengths to determine the best available OLSP to the egress node.

In one embodiment, the control label (also referred to herein as a control burst) is transmitted asynchronously ahead of the photonic data burst and on a different wavelength and/or different fiber. The time offset between the control burst and the data burst allows each of the switching nodes to process the label and configure the photonic burst switches to appropriately switch before the arrival of the corresponding data burst. The term photonic burst switch is used herein to refer to fast optical switches that do not use O-E-O conversion.

In one embodiment, ingress node $15_1$ then asynchronously transmits the optical data bursts to the switching nodes where the optical data bursts experience little or no time delay and no O-E-O conversion within each of the switching nodes. The optical control burst is always sent before the corresponding optical data burst is transmitted.

In some embodiments, the switching node may perform O-E-O conversion of the control bursts so that the node can extract and process the routing information included in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one switching node to another switching node in a similar manner until the optical control and data bursts are terminated at egress node $18_1$. A block 23 represents this operation.

The operational flow at this point depends on whether the target network is an optical WAN or a LAN. A block 24 represents this branch in the operational flow.

If the target network is an optical WAN, new optical label and payload signals are formed. In this embodiment, egress node $18_1$ prepares the new optical label and payload signals. A block 25 represents this operation.

The new optical label and payload are then transmitted to the target network (i.e., WAN in this case). In this embodiment, egress node $18_1$ includes an optical interface to transmit the optical label and payload to the optical WAN. A block 26 represents this operation.

However, if in block 24 the target network is a LAN, the optical data burst is disassembled to extract the IP packets or Ethernet frames. In this embodiment, egress node $18_1$ converts the optical data burst to electronic signals that egress node $18_1$ can process to recover the data segment of each of the packets, as represented in block 25 represents this operation.

The extracted IP data packets or Ethernet frames are processed, combined with the corresponding IP labels, and then routed to the target network (i.e., LAN in this case). In this embodiment, egress node $18_1$ forms these new IP packets. A block 25 represents this operation. The new IP packets are then transmitted to the target network (i.e., LAN) as represented in block 26.

PBS network 10 can achieve increased bandwidth efficiency through the additional flexibility afforded by the TDM channels. Although this exemplary embodiment described above includes an optical MAN having ingress, switching and egress nodes to couple multiple LANs to an optical WAN backbone, in other embodiments the networks do not have to be LANs, optical MANs or WAN backbones. That is, PBS network 10 may include a number of relatively small networks that are coupled to a relatively larger network that in turn is coupled to a backbone network.

Although a WDM embodiment is described above, in other embodiments, a single wavelength can be used for the entire PBS network. Some of these single wavelength alternative embodiments have multiple optical fibers interconnections between each node to provide increased bandwidth.

Figure 3:
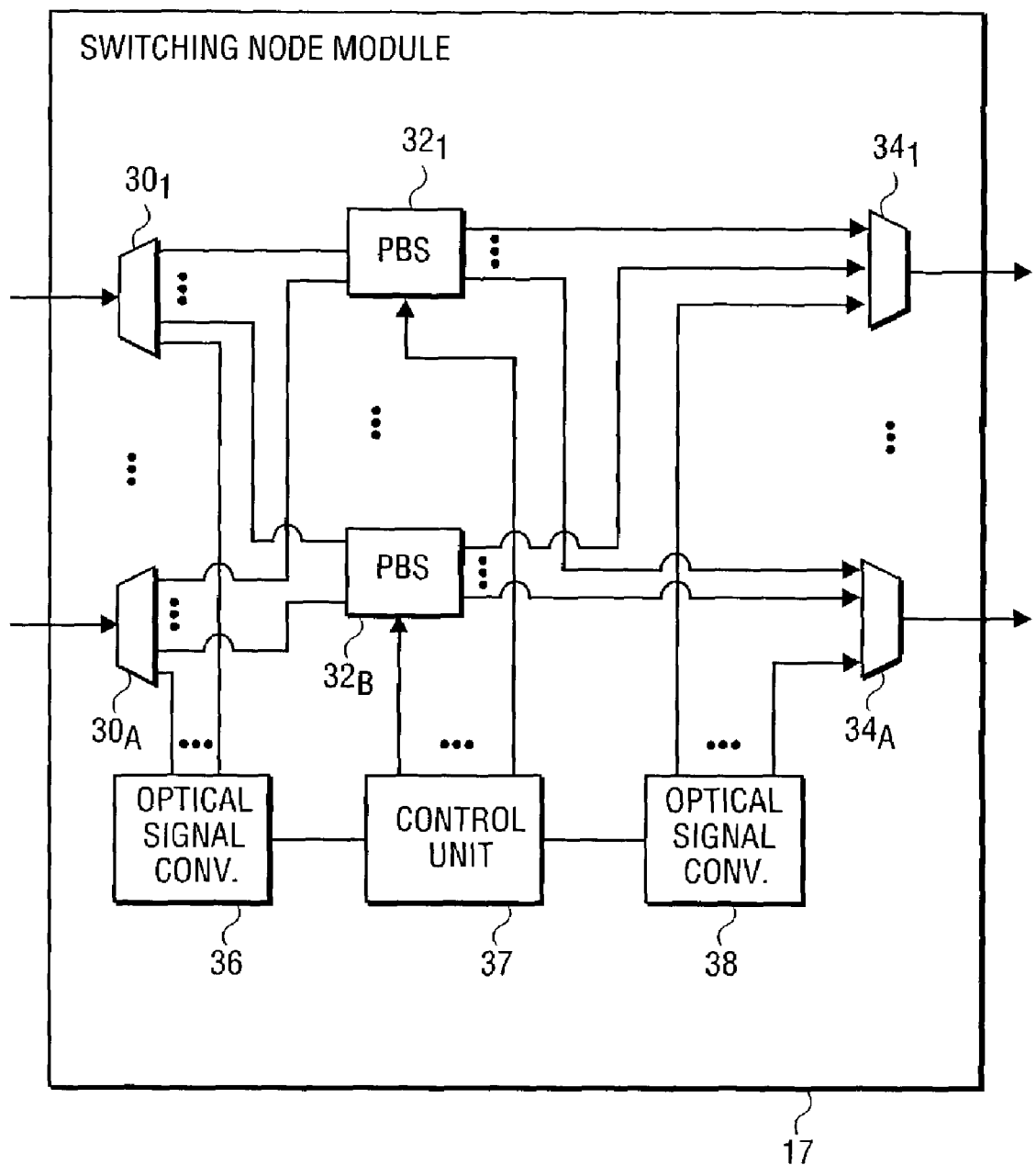
FIG. 3 is a block diagram illustrating a switching node module for use in a photonic burst-switched (PBS) network, according to one embodiment of the present invention.

FIG. 3 illustrates a module 17 for use as a switching node in photonic burst switched network 10 (FIG. 1), according to one embodiment of the present invention. In this embodiment, module 17 includes a set of optical wavelength division demultiplexers $30_1$-$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where N≧A·C+1. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control unit 37, and a set of electrical-to-optical signal converters 38 (e.g., lasers). Control unit 37 may have one or more processors to execute software or firmware programs.

Figure 10:
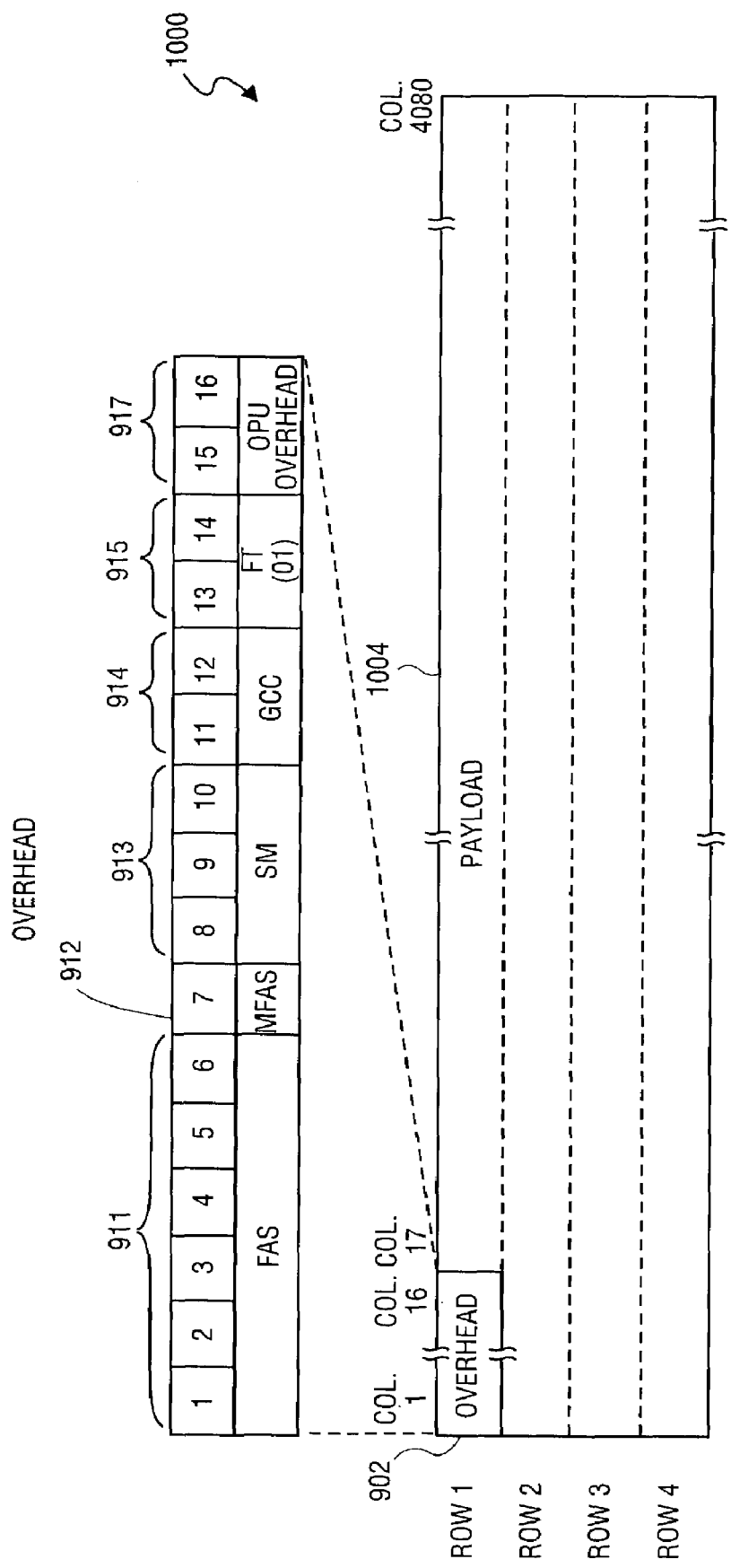
FIG. 10 is a diagram illustrating an OTU frame with disabled FEC where different types of payloads such as PBS control and data bursts are included in the payload and FEC portions of an OTU frame, according to one embodiment of the present invention.

The elements of this embodiment of module 17 are interconnected as follows. Optical demultiplexers $30_1$-$30_A$ are connected to a set of A input optical fibers that propagate input optical signals from other switching nodes of photonic burst switched network 10 (FIG. 10). The output leads of the optical demultiplexers are connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38. As described below in conjunction with the flow diagram of FIG. 5, module 17 is used to receive and transmit optical control bursts, optical data bursts, and network management control bursts. In one embodiment, the optical data bursts and optical control bursts have transmission formats as shown in FIGS. 4A and 4B.

Figure 4A:
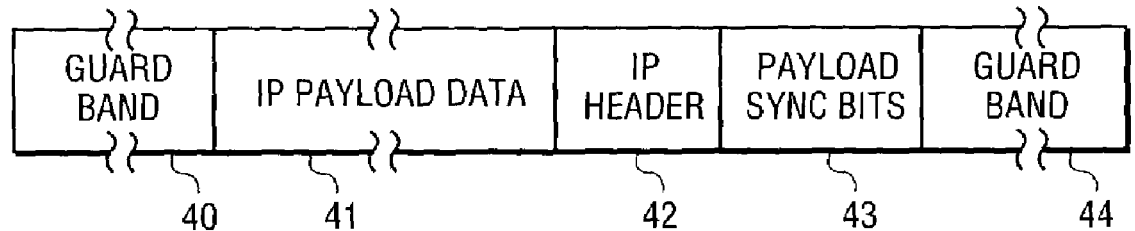
FIGS. 4A and 4B are diagram illustrating the format of an optical data burst and an optical control burst for use in a photonic burst-switched (PBS) network, according to one embodiment of the present invention.

FIG. 4A illustrates the format of an optical data burst for use in PBS network 10 (FIG. 1), according to one embodiment of the present invention. In this embodiment, each optical data burst has a start guard band 40, an IP payload data segment 41, an IP header segment 42, a payload sync segment 43 (typically a small number of bits), and an end guard band 44 as shown in FIG. 4A. In some embodiments, IP payload data segment 41 includes the statistically multiplexed IP data packets or Ethernet frames used to form the burst. Although FIG. 4A shows the payload as contiguous, module 17 transmits payloads in a TDM format. Further, in some embodiments the data burst can be segmented over multiple TDM channels. It should be pointed out that in this embodiment the optical data bursts and optical control bursts have local significance only in PBS network 10, and may loose their significance at the optical WAN.

Figure 4B:
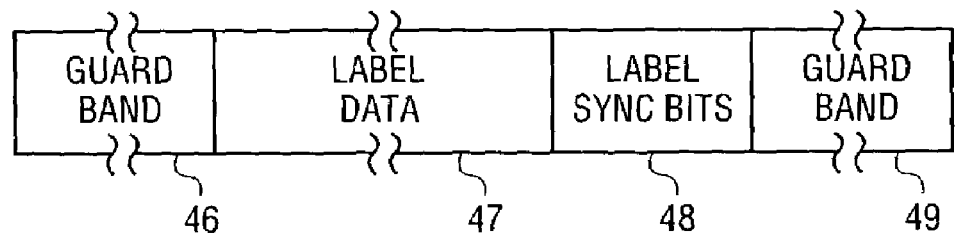

FIG. 4B illustrates the format of an optical control burst for use in photonic burst switched network 10 (FIG. 1), according to one embodiment of the present invention. In this embodiment, each optical control burst has a start guard band 46, an IP label data segment 47, a label sync segment 48 (typically a small number of bits), and an end guard band 49 as shown in FIG. 4B. In this embodiment, label data segment 45 includes all the necessary routing and timing information of the IP packets to form the optical burst. Although FIG. 4B shows the payload as contiguous, in this embodiment module 17 transmits labels in a TDM format.

In some embodiments, an optical network management control label (not shown) is also used in PBS network 10 (FIG. 1). In such embodiments, each optical network management control burst includes: a start guard band similar to start guard band 46; a network management data segment similar to data segment 47; a network management sync segment (typically a small number of bits) similar to label sync segment 48; and an end guard band similar to end guard band 44. In this embodiment, network management data segment includes network management information needed to coordinate transmissions over the network. In some embodiments, the optical network management control burst is transmitted in a TDM format.

Figure 5:
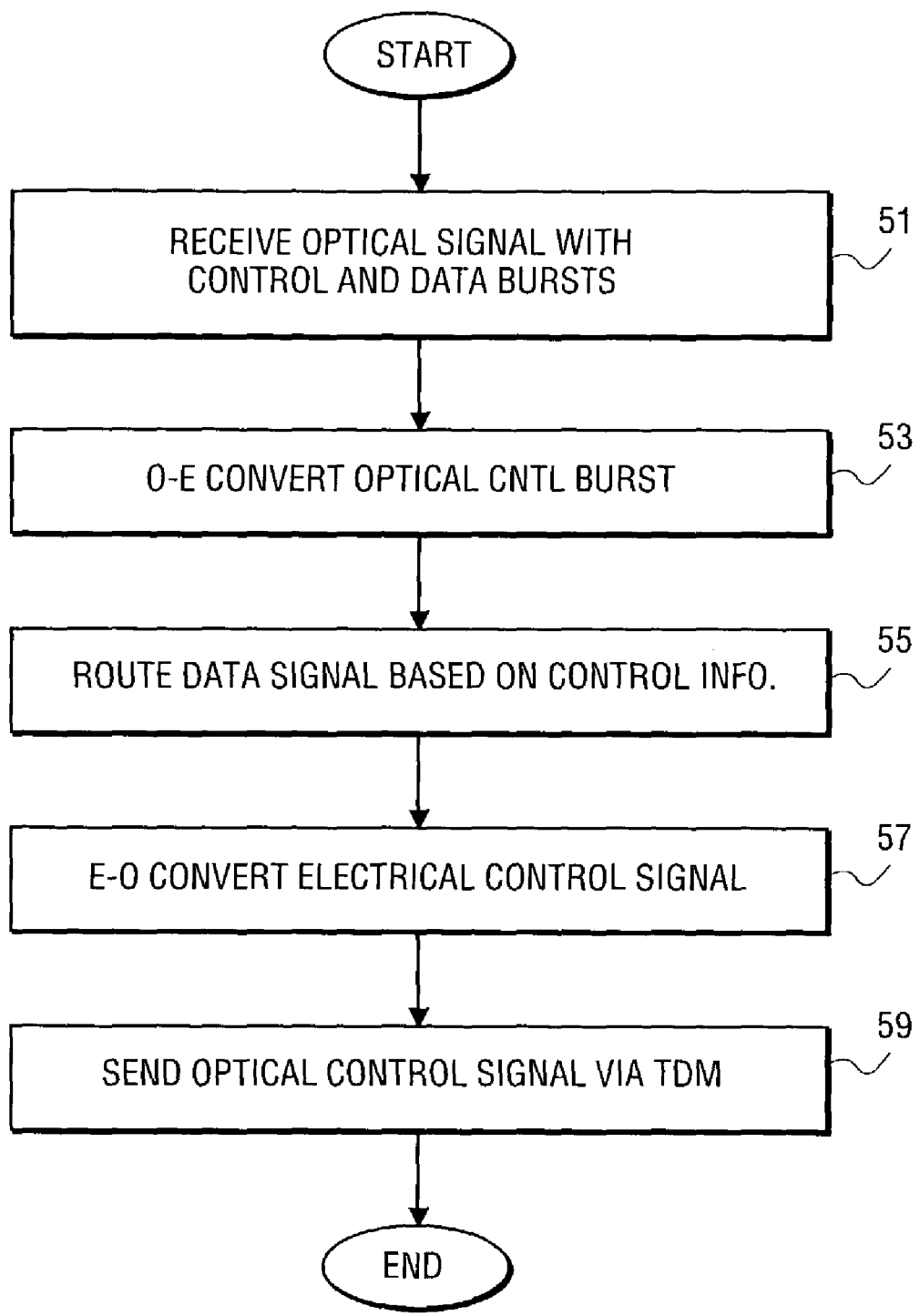
FIG. 5 is a flow diagram illustrating the operation of a switching node module, according to one embodiment of the present invention.

FIG. 5 illustrates the operational flow of module 17 (FIG. 3), according to one embodiment of the present invention. Referring to FIGS. 3 and 5, module 17 operates as follows.

Module 17 receives an optical signal with TDM label and data signals. In this embodiment, module 17 receives an optical control signal (e.g., an optical control burst) and an optical data signal (i.e., an optical data burst in this embodiment) at one or two of the optical demultiplexers. For example, the optical control signal may be modulated on a first wavelength of an optical signal received by optical demultiplexer $30_A$, while the optical data signal is modulated on a second wavelength of the optical signal received by optical demultiplexer $30_A$. In some embodiments, the optical control signal may be received by a first optical demultiplexer while the optical data signal is received by a second optical demultiplexer. Further, in some cases, only an optical control signal (e.g., a network management control burst) is received. A block 51 represents this operation.

Module 17 converts the optical control signal into an electrical signal. In this embodiment, the optical control signal is the optical control burst signal, which is separated from the received optical data signal by the optical demultiplexer and sent to optical-to-electrical signal converter 36. In other embodiments, the optical control signal can be a network management control burst (previously described in conjunction with FIG. 4B). Optical-to-electrical signal converter 36 converts the optical control signal into an electrical signal. For example, in one embodiment each portion of the TDM control signal is converted to an electrical signal. The electrical control signals received by control unit 37 are processed to form a new control signal. In this embodiment, control unit 37 stores and processes the information included in the control signals. A block 53 represents this operation.

Module 17 then routes the optical data signals (i.e., optical data burst in this embodiment) to one of optical multiplexers 34$_1$-34$_A$, based on routing information included in the control signal. In this embodiment, control unit 37 processes the control burst to extract the routing and timing information and sends appropriate PBS configuration signals to the set of B photonic burst switches 32$_1$-32$_B$ to re-configure each of the photonic burst switches to switch the corresponding optical data bursts. A block 55 represents this operation.

Module 17 then converts the processed electrical control signal to a new optical control burst. In this embodiment, control unit 37 provides TDM channel alignment so that reconverted or new optical control bursts are generated in the desired wavelength and TDM time slot pattern. The new control burst may be modulated on a wavelength and/or time slot different from the wavelength and/or time slot of the control burst received in block 51. A block 57 represents this operation.

Module 17 then sends the optical control burst to the next switching node in the route. In this embodiment, electrical-to-optical signal generator 38 sends the new optical control burst to appropriate optical multiplexer of optical multiplexers 34$_1$-34$_A$ to achieve the route. A block 59 represents this operation.

Figure 6:
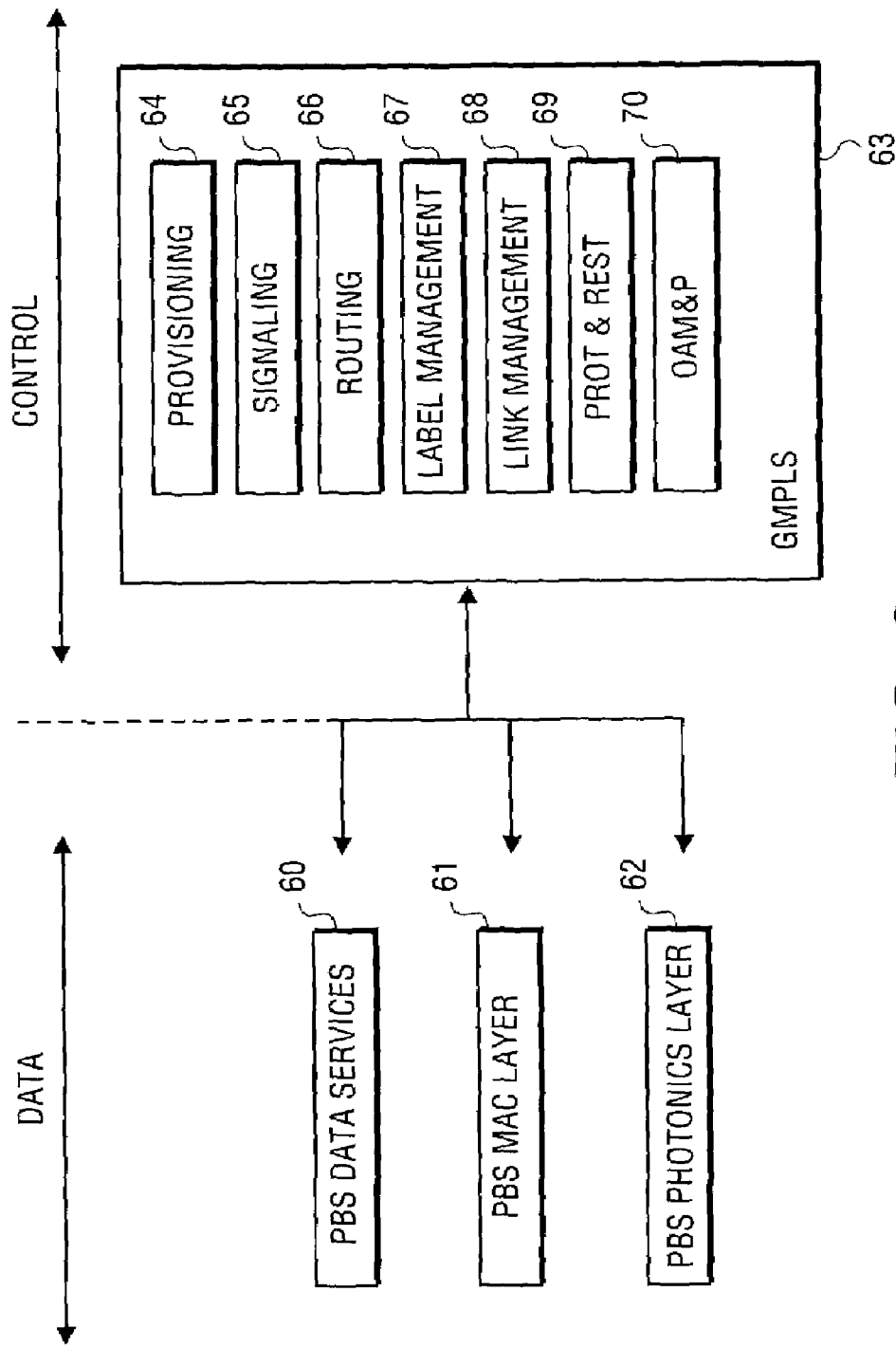
FIG. 6 is a diagram illustrating a generalized multi-protocol label switching (GMPLS)-based architecture for a PBS network, according to one embodiment of the present invention.

FIG. 6 illustrates a GMPLS-based architecture for a PBS network, according to one embodiment of the present invention. Starting with the GMPLS suite of protocols, each of the GMPLS protocols can be modified or extended to support PBS operations and optical interfaces while still incorporating the GMPLS protocols' various traffic-engineering tasks. The integrated PBS layer architecture include PBS data services layer 60 on top of a PBS MAC layer 61, which is on top of a PBS photonics layer 62. It is well known that the GMPLS suite (indicated by a block 63 in FIG. 6) includes a provisioning component 64, a signaling component 65, a routing component 66, a label management component 67, a link management component 68, and a protection and restoration component 69. In some embodiments, these components are modified or have added extensions that support the PBS layers 60-62. Further, in this embodiment, GMPLS suite 63 is also extended to include an operation, administration, management and provisioning (OAM&P) component 70.

For example, signaling component 65 can include extensions specific to PBS networks such as, for example, burst start time, burst type, burst length, and burst priority, etc. Link management component 68 can be implemented based on the well-known link management protocol (LMP) (that currently supports only SONET/SDH networks) with the necessary extensions added to support PBS networks. For example, protection and restoration component 69 can be modified to cover PBS networks by one of ordinary skill in the art in light of the present disclosure.

Further, for example, label management component 67 can be modified to support a PBS control channel label space. In one embodiment, the label operations are performed after control channel signals are O-E converted. The ingress nodes of the PBS network act as label edge routers (LERs) while the switching nodes act as label switch routers (LSRs). An egress node acts as an egress LER substantially continuously providing all of the labels of the PBS network. Component 67 can advantageously help increase the speed of control channel context retrieval (by performing a pre-established label look-up instead of having to recover a full context).

Figure 7:
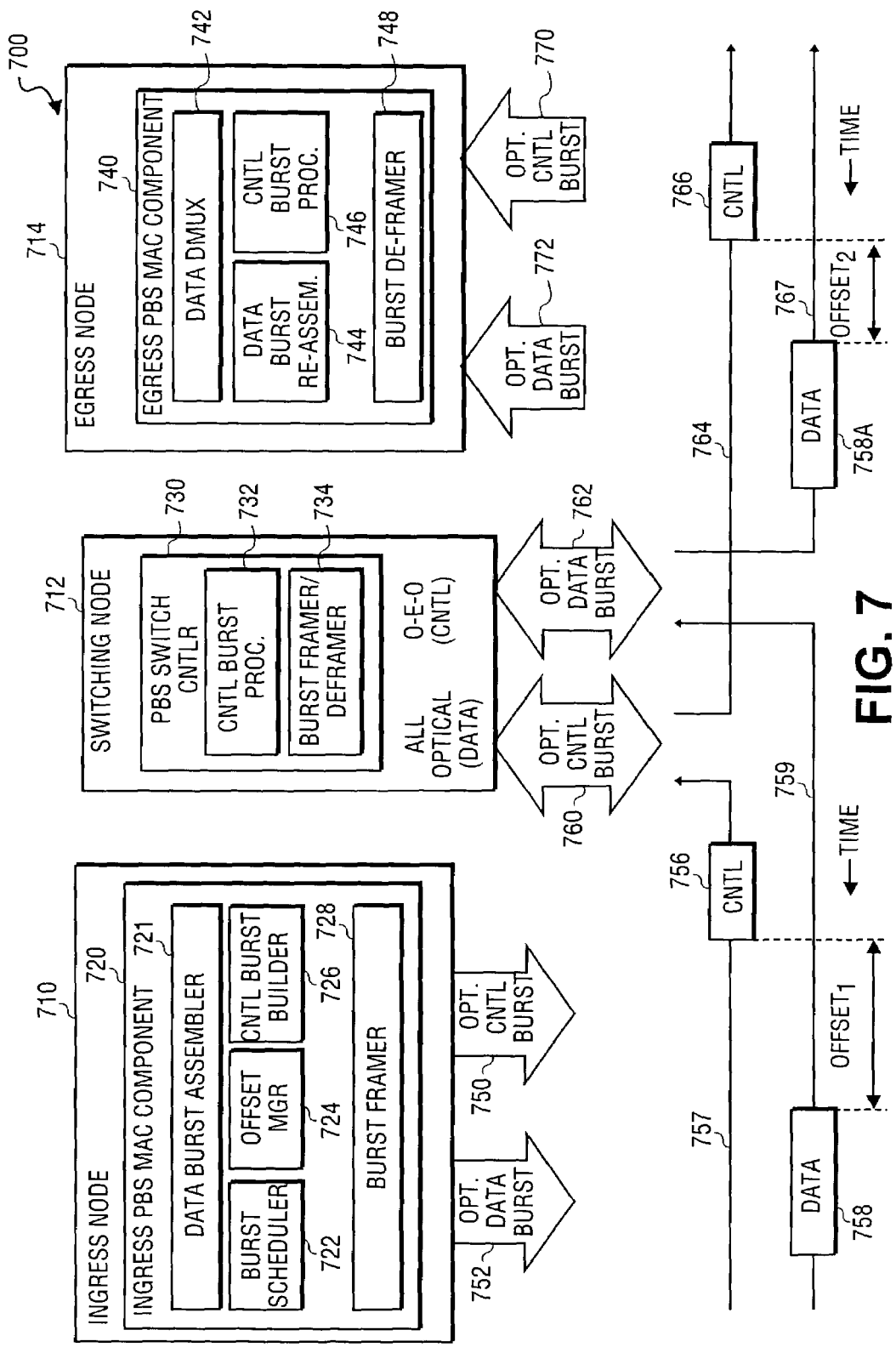
FIG. 7 is a diagram illustrating PBS optical burst flow between edge nodes and a switching node in a PBS network, according to one embodiment of the present invention.

FIG. 7 illustrates PBS optical burst flow between nodes in an exemplary PBS network 700, according to one embodiment of the present invention. System 700 includes ingress node 710, a switching node 712, an egress node 714 and other nodes (egress, switching, and ingress that are not shown to avoid obscuring the description of the optical burst flow). In this embodiment, the illustrated components of ingress, switching and egress nodes 710, 712 and 714 are implemented using machine-readable instructions that cause a machine (e.g., a processor) to perform operations that allow the nodes to transfer information to and from other nodes in the PBS network. In this example, the lightpath for the optical burst flow is from ingress node 710, to switching node 712 and then to egress node 714.

Ingress node 710 includes an ingress PBS MAC layer component 720 having a data burst assembler 721, a data burst scheduler 722, an offset time manager 724, a control burst builder 726 and a burst framer 728. In one embodiment, data burst assembler 721 assembles the data bursts to be optically transmitted over PBS network 10 (FIG. 1). In one embodiment, the size of the data burst is determined based on many different network parameters such as quality-of-service (QoS), number of available optical channels, the size of electronic buffering at the ingress nodes, the specific burst assembly algorithm, etc.

Data burst scheduler 722, in this embodiment, schedules the data burst transmission over PBS network 10 (FIG. 1). In this embodiment, ingress PBS MAC layer component 710 generates a bandwidth request for insertion into the control burst associated with the data burst being formed. In one embodiment, data burst scheduler 722 also generates the schedule to include an offset time (from offset time manager 724 described below) to allow for the various nodes in PBS network 10 to process the control burst before the associated data burst arrives.

In one embodiment, offset time manager 724 determines the offset time based on various network parameters such as, for example, the number of hops along the selected lightpath, the processing delay at each switching node, traffic loads for specific lightpaths, and class of service requirements.

Then control burst builder 726, in this embodiment, builds the control burst using information such as the requested bandwidth, burst scheduling time, in-band or OOB (defined above in conjunction with FIG. 1) signaling, burst destination address, data burst length, data burst channel wavelength, offset time, priorities, and the like.

Burst framer 728 frames the control and data bursts (using the framing format described below in conjunction with FIGS. 7-11 in some embodiments). Burst framer 728 then transmits the control burst over PBS network 10 via a physical optical interface (not shown), as indicated by an arrow 750. In this embodiment, the control burst is transmitted OOB to switching node 712, as indicated by an optical control burst 756 and PBS TDM channel 757 in FIG. 7. Burst framer 728 then transmits the data burst according to the schedule generated by burst scheduler 722 to switching node 712 over the PBS network via the physical optical interface, as indicated by an optical burst 758 and PBS TDM channel 759 in FIG. 7. The time delay between optical bursts 756 (control burst) and 758 (data burst) in indicated as an OFFSET$_1$ in FIG. 7.

Switching node 712 includes a PBS switch controller 730 that has a control burst processing component 732, a burst framer/de-framer 734 and a hardware PBS switch (not shown).

In this example, optical control burst 756 is received via a physical optical interface (not shown) and optical switch (not shown) and converted to electrical signals (i.e., O-E conversion). Control burst framer/de-framer 734 de-frames the control burst information and provides the control information to control burst processing component 732. Control burst processing component 732 processes the information, determining the corresponding data burst's destination, bandwidth reservation, next control hop, control label swapping, etc.

PBS switch controller component 730 uses some of this information to control and configure the optical switch (not shown) to switch the optical data burst at the appropriate time duration to the next node (i.e., egress node 714 in this example) at the proper channel. In some embodiments, if the reserved bandwidth is not available, PBS switch controller component 730 can take appropriate action. For example, in one embodiment PBS switch controller 730 can: (a) determine a different lightpath to avoid the unavailable optical channel (e.g., deflection routing); (b) delay the data bursts using integrated buffering elements within the PBS switch fabric such as fiber delay lines; (c) use a different optical channel (e.g. by using tunable wavelength converters); and/or (d) drop only the coetaneous data bursts. Some embodiments of PBS switch controller component 730 may also send a negative acknowledgment message back to ingress node 710 to re-transmit the dropped burst.

However, if the bandwidth can be found and reserved for the data burst, PBS switch controller component 730 provides appropriate control of the hardware PBS switch (not shown). In addition, PBS switch controller component 730 generates a new control burst based on the updated reserved bandwidth from control burst processing component 732 and the available PBS network resources. Control burst framer/de-framer 734 then frames the re-built control burst, which is then optically transmitted to egress node 714 via the physical optical interface (not shown) and the optical switch (not shown), as indicated by PBS TDM channel 764 and an optical control burst 766 in FIG. 7.

Subsequently, when the optical data burst corresponding to the received/processed control burst is received by switching node 712, the PBS switch fabric is already configured to switch the optical data burst and route it to egress node 714. In other situations, switching node 712 can switch the optical data burst to a different node (e.g., another switching node not shown in FIG. 7). The optical data burst from ingress node 710 is then switched to egress node 714, as indicated by PBS TDM channel 767 and an optical data burst 758A. In this embodiment, optical data burst 758A is simply optical data burst 758 re-routed by the hardware PBS switch (not shown), but possibly transmitted in a different TDM channel. The time delay between optical control burst 766 and optical data burst 758A is indicated by an OFFSET$_2$ in FIG. 7, which is smaller than OFFSET$_1$ due, for example, to processing delay and other timing errors in switching node 712.

Egress node 714 includes a PBS MAC component 740 that has a data demultiplexer 742, a data burst re-assembler 744, a control burst processing component 746, and a data burst de-framer 748.

Egress node 714 receives the optical control burst as indicated by an arrow 770 in FIG. 7. Burst de-framer 748 receives and de-frames the control burst via a physical O-E interface (not shown). In this embodiment, control burst processing component 746 processes the de-framed control burst to extract the pertinent control/address information.

After the control burst is received, egress node 714 receives the data burst(s) corresponding to the received control burst, as indicated by an arrow 772 in FIG. 7. In this example, egress node 714 receives the optical data burst after a delay of OFFSET$_2$, relative to the end of the control burst. In a manner similar to that described above for received control bursts, burst de-framer 748 receives and de-frames the data burst. Data burst re-assembler 744 then processes the de-framed data burst to extract the data (and to re-assemble the data if the data burst was a fragmented data burst). Data de-multiplexer 742 then appropriately de-multiplexes the extracted data for transmission to the appropriate destination (which can be a network other than the PBS network).

Figure 8:
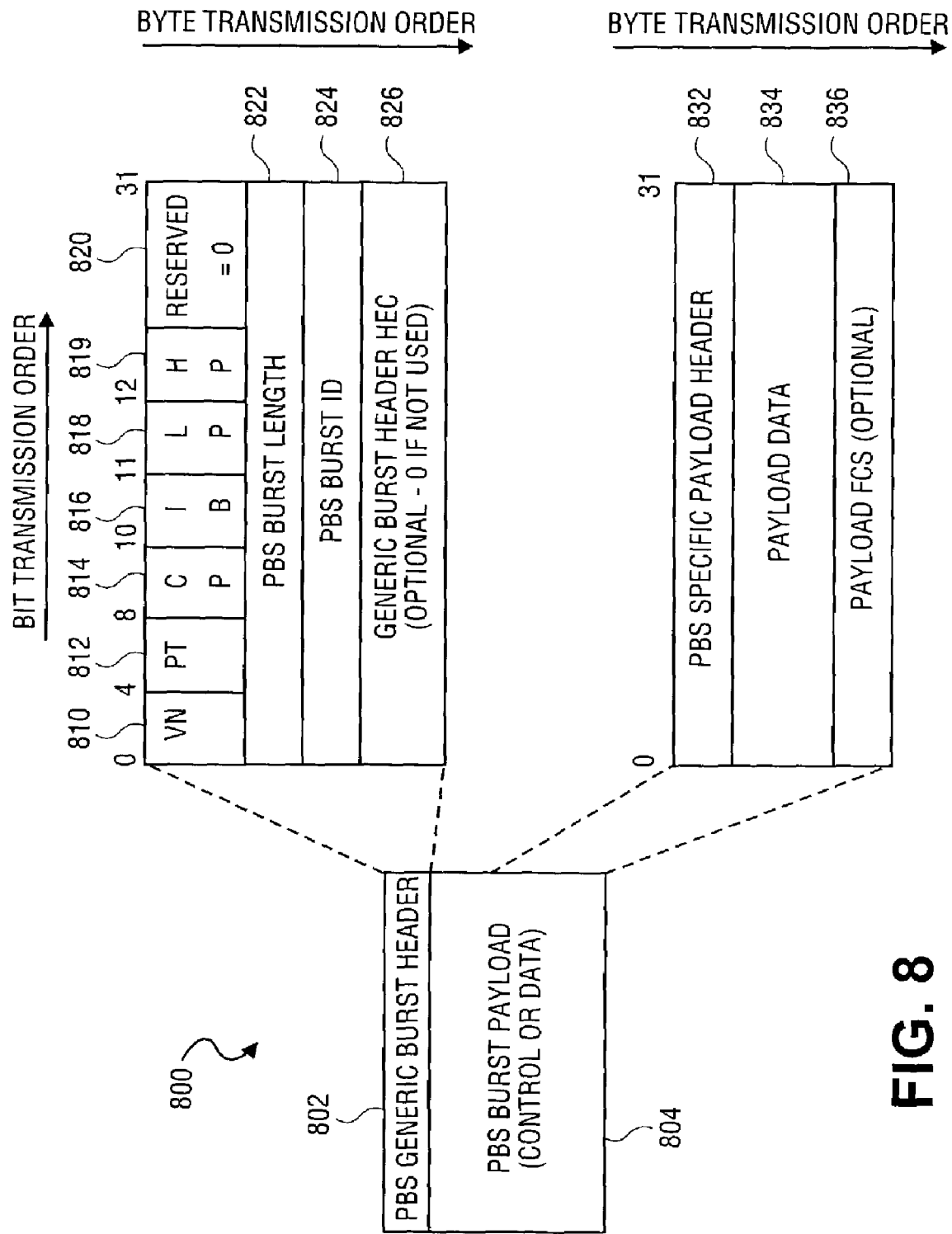
FIG. 8 is a diagram illustrating a PBS framing format for PBS optical bursts, according to one embodiment of the present invention.

FIG. 8 illustrates a generic PBS framing format 800 for PBS optical bursts, according to one embodiment of the present invention. Generic PBS frame 800 includes a PBS generic burst header 802 and a PBS burst payload 804 (which can be either a control burst or a data burst). FIG. 8 also includes an expanded view of PBS generic burst header 802 and PBS burst payload 804.

PBS generic burst header 802 is common for all types of PBS bursts and includes a version number (VN) field 810, a payload type (PT) field 812, a control priority (CP) field 814, an in-band signaling (IB) field 816, a label present (LP) field 818, a header error correction (HEC) present (HP) field 819, a burst length field 822, and a burst ID field 824. In some embodiments, PBS generic burst header also includes a reserved field 820 and a HEC field 826. Specific field sizes and definitions are described below for framing format having 32-bit words; however, in other embodiments, the sizes, order and definitions can be different.

In this embodiment, PBS generic burst header 802 is a 4-word header. The first header word includes VN field 810, PT field 812, CP field 814, IB field 816 and LP field 818. VN field 810 in this exemplary embodiment is a 4-bit field (e.g., bits 0-3) defining the version number of the PBS Framing format being used to frame the PBS burst. In this embodiment, VN field 810 is defined as the first 4-bits of the first word, but in other embodiments, it need not be the first 4-bits, in the first word, or limited to 4-bits.

PT field 812 is a 4-bit field (bits 4-7) that defines the payload type. For example, binary "0000" may indicate that the PBS burst is a data burst, while binary "0001" indicates that the PBS burst is a control burst, and binary "0010" indicates that the PBS burst is a management burst. In this embodiment, PT field 812 is defined as the second 4-bits of the first word, but in other embodiments, it need not be the second 4-bits, in the first word, or limited to 4-bits.

CP field 814 is a 2-bit field (bits 8-9) that defines the burst's priority. For example, binary "00" may indicate a normal priority while binary "01" indicates a high priority. In this embodiment, CP field 814 is defined bits 8 and 9 of the first word, but in other embodiments, it need not be bits 8 and 9, in the first word, or limited to 2-bits.

IB field 816 is a one-bit field (bit 10) that indicates whether the PBS control burst is being signaled in-band or OOB. For example, binary "0" may indicate OOB signaling while binary "1" indicates in-band signaling. In this embodiment, IB field 816 is defined as bit 10 of the first word, but in other embodiments, it need not be bit 10, in the first word, or limited to one-bit.

LP field 818 is a one-bit field (bit 11) used to indicate whether a label has been established for the lightpath carrying this header. In this embodiment, LP field 818 is defined as bit 11 of the first word, but in other embodiments, it need not be bit 11, in the first word, or limited to one-bit.

HP field 819 is a one-bit field (bit 12) used to indicate whether header error correction is being used in this control burst. In this embodiment, HP field 819 is defined as bit 12 of the first word, but in other embodiments, it need not be bit 12, in the first word, or limited to one-bit. The unused bits (bits 13-31) form field(s) 820 that are currently unused and reserved for future use.

The second word in PBS generic burst header 802, in this embodiment, includes PBS burst length field 822, which is used to store a binary value equal to the length of the number of bytes in PBS burst payload 804. In this embodiment, the PBS burst length field is 32-bits. In other embodiments, PBS burst length field 822 need not be in the second word and is not limited to 32-bits.

In this embodiment, the third word in PBS generic burst header 802 includes PBS burst ID field 824, which is used to store an identification number for this burst. In this embodiment, PBS burst ID field 824 is 32-bits generated by the ingress node (e.g., ingress node 710 in FIG. 7). In other embodiments, PBS burst ID field 824 need not be in the third word and is not limited to 32-bits.

The fourth word in PBS generic burst header 802, in this embodiment, includes generic burst header HEC field 826, which is used to store an error correction word. In this embodiment, generic burst header HEC field 826 is 32-bits generated using any suitable known error correction technique. In other embodiments, generic burst header HEC field 826 need not be in the fourth word and is not limited to 32-bits. As in indicated in FIG. 8, generic burst header HEC field 826 is optional in that if error correction is not used, the field may be filled with all zeros. In other embodiments, generic burst header HEC field 826 is not included in PBS generic burst header 802.

PBS burst payload 804 is common for all types of PBS bursts and includes a PBS specific payload header field 832, a payload field 834, and a payload frame check sequence (FCS) field 836.

In this exemplary embodiment, PBS specific payload header 832 is the first part (i.e., one or more words) of PBS burst payload 804. Specific payload header field 832 for a control burst is described below in more detail in conjunction with FIG. 9. Similarly, specific payload field 832 for a data burst is described below in conjunction with FIG. 9. Typically, specific payload header field 832 includes one or more fields for information related to a data burst, which can be either this burst itself or included in another burst associated with this burst (i.e., when this burst is a control burst).

Payload data field 834, in this embodiment, is the next portion of PBS burst payload 804. In some embodiments, control bursts have no payload data, so this field may be omitted or include all zeros. For data bursts, payload data field 834 may be relatively large (e.g., including multiple IP packets or Ethernet frames).

Payload FCS field 836, in this embodiment, in the next portion of PBS burst payload. In this embodiment, payload FCS field 836 is a one-word field (i.e., 32-bits) used in error detection and/or correction. As in indicated in FIG. 8, payload FCS field 836 is optional in that if error detection/correction is not used, the field may be filled with all zeros. In other embodiments, payload FCS field 836 is not included in PBS burst payload 804.

Figure 9:
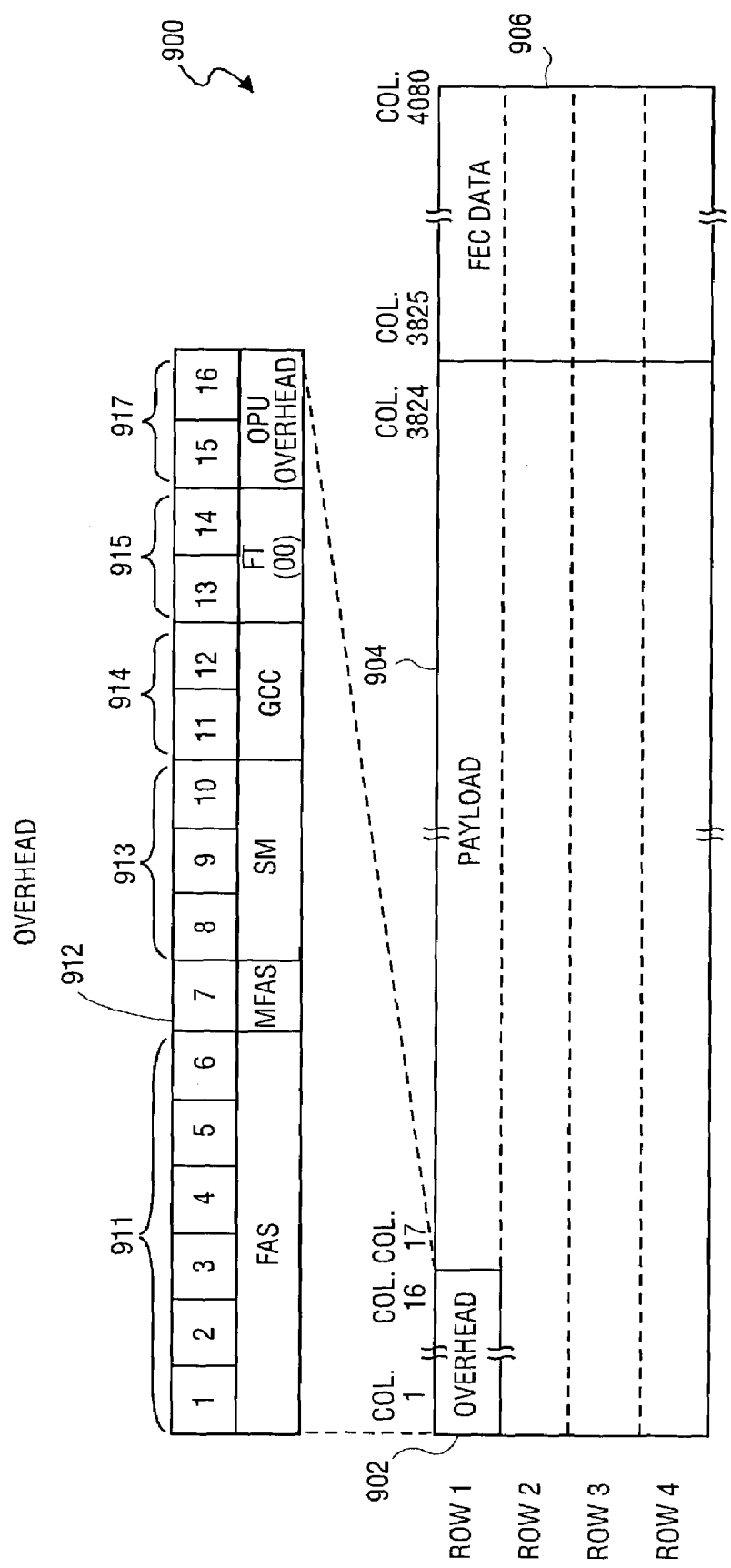
FIG. 9 is a diagram illustrating an optical channel transport unit (OTU) frame according to the ITU-T Recommendation G.709 standard, which has been modified to include different frame types and different types of optical payloads according to one embodiment of the present invention.

FIG. 9 illustrates the format of an optical channel transport unit (OTU) frame 900 based on the International Telecommunication Union (ITU)-T Recommendation G.709 standard, version Amendment 1, November 2001 (also referred to herein as the G.709 standard), according to one embodiment of the present invention. To improve clarity, FIG. 9 includes an expanded view of the overhead portion of the OTU frame. In one embodiment of a PBS network, PBS control and data bursts as well as metadata are encapsulated in such OTU frames so that commercially available G.709 interface modules and systems can be used in implementing a PBS network. In a G.709 standard-based PBS network, the TDM channels are fixed synchronous time slots.

Further, in the embodiment of FIG. 9, the G.709 standard-based OTU frame has been modified to enable different types of G.709 frames. In one embodiment, this can be achieved by the disabling the forward error correction (FEC) feature and reusing this portion of the OTU frame to transport different types of payloads. This OTU frame modification feature can be used to advantageously increase the throughput of G.709-based PBS networks as described below.

As shown in FIG. 9, OTU frame 900 includes an overhead portion 902, a payload portion 904 and a FEC portion 906. As is described in the G.709 standard, a standard OTU frame is formed of a block of 4 rows and 4,080 columns. Columns 1 through 16 of the first row include overhead portion 902. Columns 3,825 through 4,080 of all 4 rows include FEC portion 906. The remaining portion includes payload portion 904.

As shown in the expanded view of overhead portion 902, in this embodiment, overhead portion 902 includes a frame alignment signal (FAS) field 911 in columns 1 through 6; a multi frame alignment signal (MFAS) field 912 in column 7; a section monitoring (SM) field 913 in columns 8 through 10; a general communication channel (GCC) field 914 in columns 11 and 12, OTU frame type (FT) field 915 in columns 13 and 14; and a optical payload unit (OPU) overhead field 917 in columns 15 and 16. In conventional G.709 standard implementations, columns 13 and 14 of portion 902 are reserved bits. Thus, in this embodiment of the present invention, the bits in the reserved field (i.e., the two bits in column 13 and 14) are used to implement FT field 915.

Other than FT field 915 and OPU overhead field 917, the fields of overhead portion 902 are defined and used in accordance with the aforementioned G.709 standard. Embodiments of the FT and OPU overhead fields are described below.

Payload portion 904 is used to include a PBS burst, which can be either PBS control burst or PBS data burst. In this embodiment, the PBS burst is framed as described above in conjunction with FIG. 8. Thus, for example, the PBS burst may be: a control burst, a data burst, or a network management burst; normal priority or high priority; or in-band or OOB (see the PBS generic header in FIG. 8). Payload portion 904 may include the data of only a part of a PBS data burst in some instances, which can be concatenated with PBS data burst(s) in other received OTU frame(s). In other instances, payload portion 904 may be able to include one or more PBS data bursts.

In some applications, the FEC function can be turned off to free up the FEC portion 906 within the OTU frame for other uses without a significant increase in transmission errors for photonic burst switched (PBS) networks. For example, in networks having relatively short optical paths with no or limited degradation mechanisms (e.g., MAN, enterprise networks, campus networks, etc.) and/or limited number of hops along a given OLSP, the need for FEC is significantly diminished. This is because the propagating optical signals in hop- and span-constrained (e.g., with relatively short lightpaths $\leq$10 km) networks typically experience limited loss due to noise and other linear or non-linear degradation mechanisms. Thus, the FEC feature can be turned off in such applications without noticeably increasing the received error rate.

In this embodiment, FT field 915 can define four different OTU frame types. For example, one G.709-based frame type could be the conventional G.709 format with FEC functionality. For example, this frame type could be indicated by a "00" in the FT field.

A second G.709-based frame type could be the FEC feature being turned off, but with the freed FEC portion being combined with the payload portion to form a single large payload portion (described further below in conjunction with FIG.

10). The single large payload portion could be used to transport a single type of optical burst data (e.g., control, data or management), or different combinations of these types of data. As previously stated, different types of data can be distinguished by using delimiters between the optical bursts, or by identifying the bursts by extracting "type" information that is included in the header fields. This frame type could be indicated by a "01" in the FT field.

A third G.709-based frame type could be the FEC feature being turned off, but with the FEC portion being used to include a type of data that is different from that included in the payload portion. That is, the partition between column 3824 and column 3825 still exists, but the portion from column 3825 to column 4080 is used to include data other than FEC data (described further below in conjunction with FIG. 11). For example, the payload portion can be used to include optical data burst data while the FEC portion can be used to include optical control burst data; or the payload portion can be used to include optical control burst data (or optical data burst data) while the FEC portion can be used to include metadata. This frame type could be indicated by a "10" in the FT field.

A fourth G.709-based frame type could be the FEC feature being turned off, but with the FEC portion being used to form a second payload portion. In this exemplary frame type, the partition between the payloads can be arbitrarily assigned (rather than between column 3824 and column 3825 as described above for the third G.709-based frame type). This fourth frame type is described further below in conjunction with FIG. 12. The second payload portion can be used to include data other than FEC data. For example, the payload portion can be used to include optical data burst data while the FEC portion can be used to include optical control burst data; or the payload portion can be used to include optical control burst data (or optical data burst data) while the FEC portion can be used to include metadata. This frame type could be indicated by a "11" in the FT field.

Although four possible frame types are described above, in other embodiments different frame types may be used.

Referring to the embodiment of the OTU frame type shown in FIG. 9 (i.e., the FT field 915 is set to "00"), OPU overhead field 917 is used to indicate the type of payload of the current OTU frame. For example, the value "00" in OPU overhead field 917 indicates that the payload is a PBS control burst; "01" indicates that the payload is a PBS data burst; "10" indicates that the payload is PBS metadata; and "11" is "reserved". In other embodiments, different definitions for the values stored in OPU overhead field 917 can be used.

FIG. 10 illustrates an OTU frame 1000 that includes one or more PBS optical control or data bursts in what would normally be the payload and FEC portions of a conventional G.709 frame, according to one embodiment of the present invention. In some embodiments of the present invention, the format of OTU frame 1000 is used when FT field 915 is set to "01", indicating that the FEC is disabled and what was the FEC portion can now be used for other data.

In this embodiment, OTU frame 1000 includes overhead portion 902 and a payload portion 1004 (which in effect is implemented with payload and FEC portions 904 and 906 in FIG. 9). Thus, the bits that would have been used for FEC data can now include PBS control bursts, PBS data bursts, or PBS metadata, which can increase the throughput of the PBS network. Payload portion 1004 can be used to include, for example, only a single type of optical burst data (control, data, network management or metadata), or a combination of different types of optical burst data. The different types of data can be distinguished, for example, by using delimiters or by using a "type" field in a header of each optical burst included in payload portion 1004.

OPU overhead field 917 can be used to indicate the type of data stored in the freed FEC portion. For example, in the embodiment of FIG. 10, the freed FEC portion can be used to include PBS control and/or data burst data. In other embodiments, the freed FEC portion can include PBS metadata. In some embodiments, PBS metadata are complex data structures providing information that is associated with the transmitted control and data bursts within the PBS network. In this context, the PBS metadata is data related to the different applications or IP flows transported by the PBS network. For example, the control burst has the notion of high/low priority burst. The metadata can be used to characterize more precisely what this means and what kind of action should be taken by the switching node along the way. For example, for a real-time voice traffic with high priority, the action to take if the PBS switch is congested is as follows: (a) drop if data burst not forwarded within 100 msec (voice data might become useless maybe after that time); and (b) do not send back NACK to source.

In another example for backup data, the action to be taken if the PBS network is congested is as follows: (a) store data burst while waiting for opportunity to transmit; (b) if data burst is stored and transmission opportunity for smaller data burst is found, then the intermediate burst can segment the data burst; and (c) send a NACK message back to the originating source to re-transmit if all contention resolution methods have failed and the data burst is dropped. In these examples, metadata can provide a great deal of added flexibility to the processing policies of the control, data or management bursts.

Figure 11:
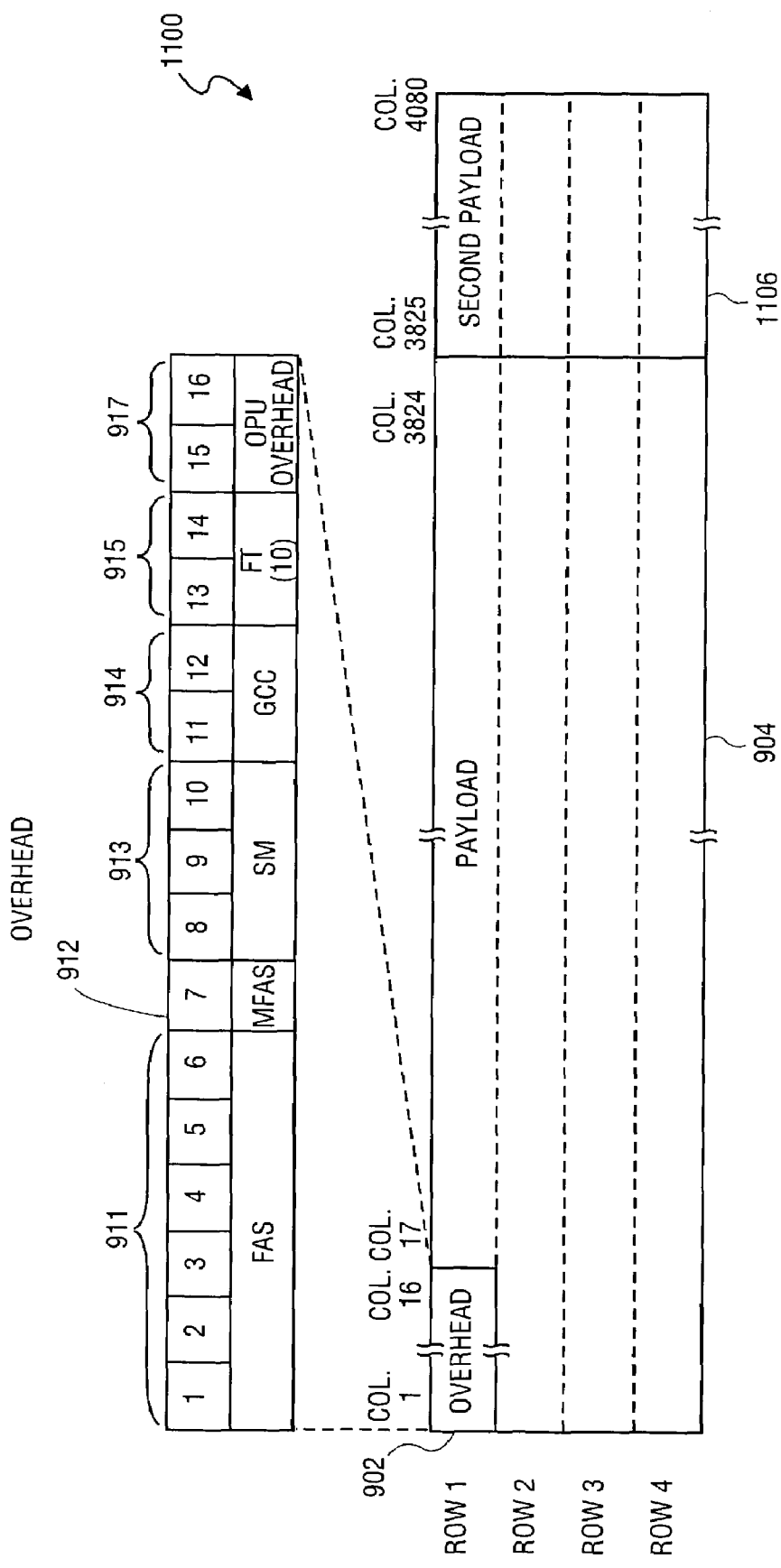
FIG. 11 is a diagram illustrating an OTU frame with disabled FEC where different types of payloads such as PBS optical control and data bursts and metadata are included separately in the payload and FEC portions of the OTU frame, according to one embodiment of the present invention.

FIG. 11 illustrates an OTU frame 1100 that includes two different types of payloads. In some embodiments of the present invention, FT field 915 is set to "10", indicating that the FEC is disabled, but the OTU frame 1100 is partitioned according to the G.709-based frame to include different types of payloads. The first type of payload in the payload portion of the G.709-based frame can be PBS control burst, PBS data burst, and/or PBS metadata. The other type of payload, which can be PBS control data or PBS metadata, would reside in what was the FEC portion of the G.709-based frame, according to one embodiment of the present invention. In this embodiment, OTU frame 1100 includes overhead portion 902, payload portion 904, and a second payload portion 1106 (which in effect is implemented with FEC portion 906 in FIG. 9). Thus, the bits that would have been used for FEC data can now include PBS metadata, which can increase the throughput of the PBS network.

In the OTU frame type shown in FIG. 11, OPU overhead field 917 is used to indicate the types of payloads of the current OTU frame. In the embodiment of FIG. 11, the freed FEC portion can be used to include a type of data that is different from that included in the payload portion (e.g., optical data burst in the payload portion but optical control burst in the freed FEC portion). For example, in one embodiment a value of "00" in OPU overhead field 917 indicates that the first payload is a PBS control burst and the second payload is PBS metadata. A value of "01" in OPU overhead field 917 indicates that the first payload is a PBS data burst and the second payload is PBS metadata. A value of "10" in OPU overhead field 917 indicates that the first payload is a PBS data burst and the second payload is a PBS control burst; and a value of "11" in OPU overhead field 917 indicates the first payload is PBS metadata and the second payload is a PBS control burst. In other embodiments, different definitions for the values stored in OPU overhead field 917 can be used.

Figure 12:
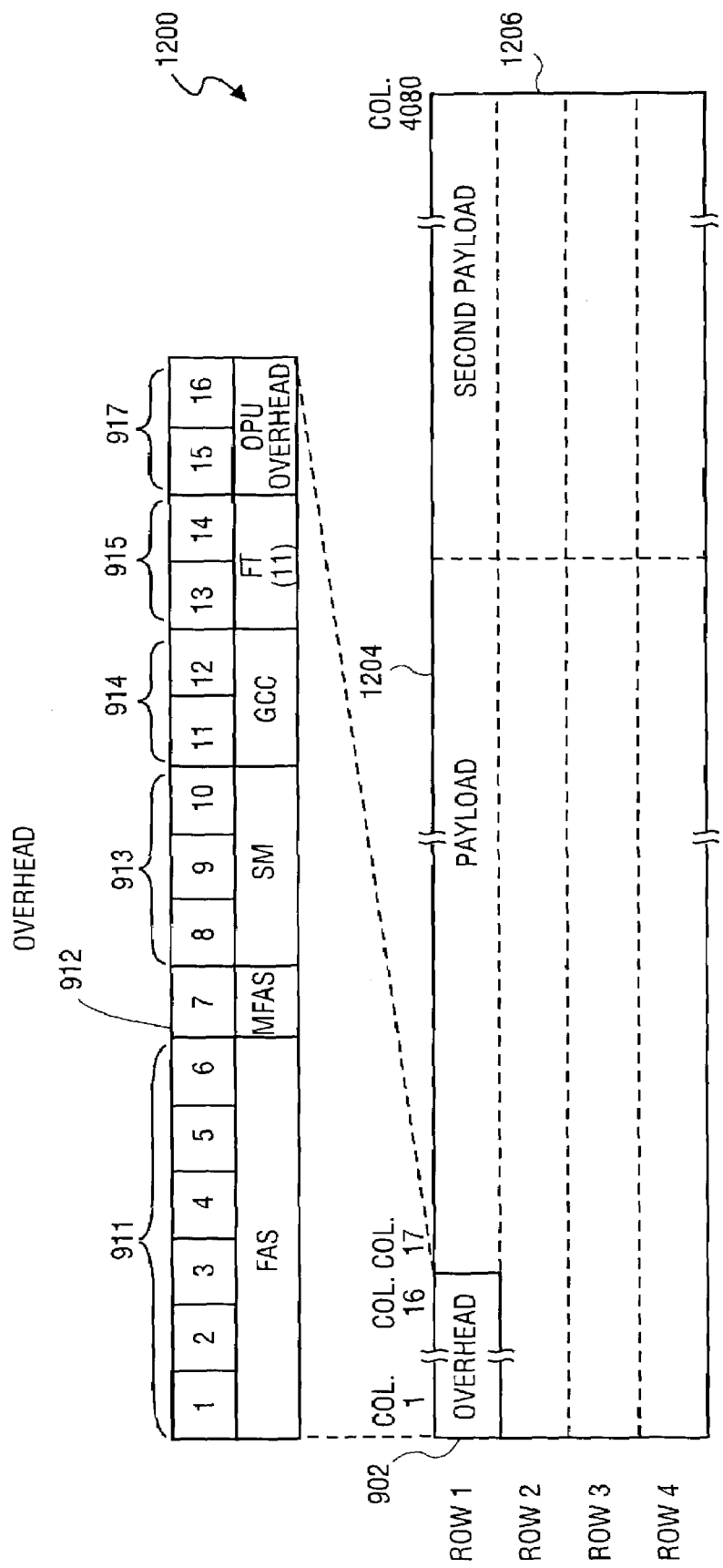
FIG. 12 is a diagram illustrating an OTU frame with disabled FEC where the frame is arbitrarily partitioned to include different types of payloads such as PBS optical control and data bursts and metadata at the different portions of the frame, according to one embodiment of the present invention.

FIG. 12 illustrates an OTU frame 1200 that has a "11" in the two-bit FT field 915. In this embodiment, OTU frame 1200 is similar to OTU frame 1100 (FIG. 11) in that it has two payload portions; i.e., first payload portion 1204 and a second payload portion 1206. However, in this embodiment of OTU frame 1200, the partition between the two payload portions is not between columns 3824 and 3825 as in OTU frame 1100. Rather, the partition can be made between an arbitrarily pre-selected pair of columns. This embodiment can increase flexibility in the payload types that can be included in the OTU frame.

Figure 13:
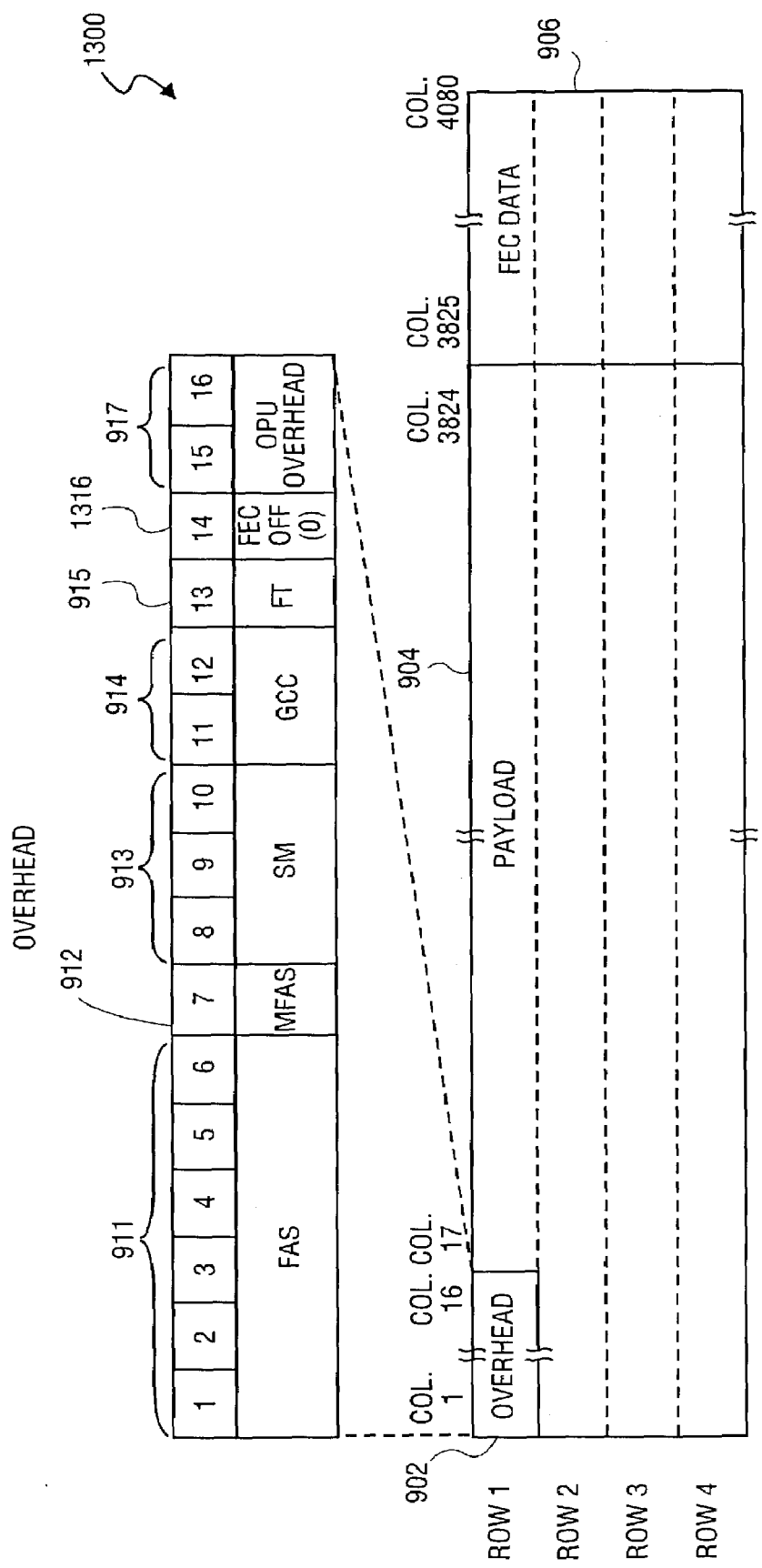
FIGS. 13, 13A and 13B are diagrams illustrating an optical channel transport unit (OTU) frames according to the ITU-T Recommendation G.709 standard, which has been modified to include different frame types and different types of optical payloads according to another embodiment of the present invention.
Figure 13A:
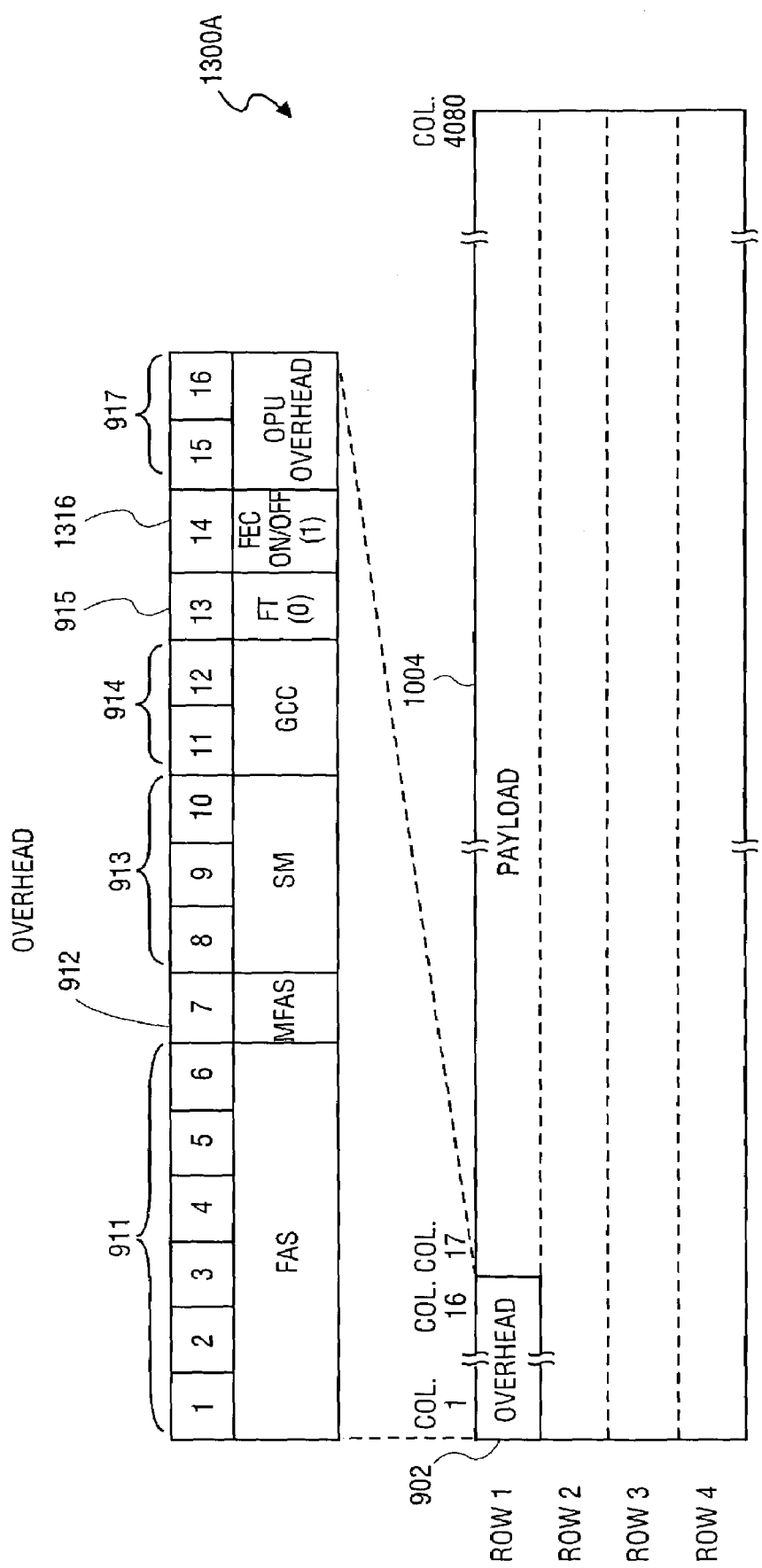
Figure 13B:
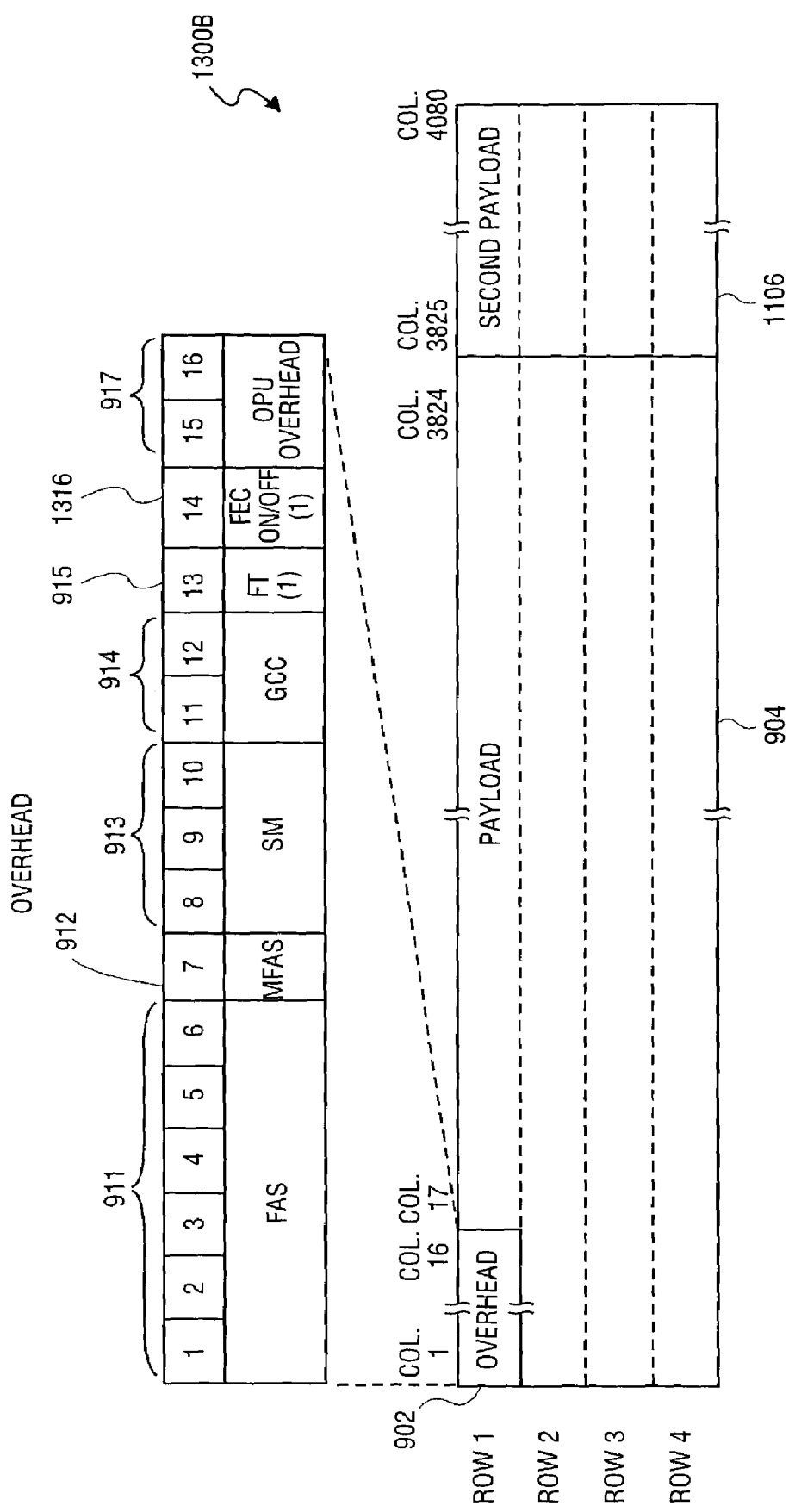

FIG. 13 illustrates an embodiment of an alternative frame type 1300 in which FT field 915 is a one-bit field in column 13. In this alternative embodiment, frame type 1300 includes an FEC on/off field 1316 in column 14. In this alternative embodiment, FEC on/off field 1316 is used to indicate whether FEC is being used in the current frame. For example, in this embodiment, the "0" in FEC on/off field 916 indicates that FEC is being used, whereas as "1" in FEC on/off field 1316 would indicate that FEC is not being used (i.e., FEC is off). In this embodiment, FT field 915 is used when FEC is off (i.e., when a "1" is in FEC on/off field 1316). FT field 915 can be used to indicate which of two predetermined OTU frame types (e.g., the frame types of FIGS. 10-12) is being used in the current frame. FIG. 13 illustrates when FEC is being used (i.e., FEC on/off field 1316 is set to "0"). In this embodiment, frame type 1300 is substantially similar to frame type 900 (FIG. 9), except for deleting one of the bits of FT field 915 for use as FEC on/off field 1316. FIGS. 13A and 13B illustrate examples of different OTU frames when FEC is not being used (i.e., FEC on/off field 1316 is "1"). In particular, FIG. 13A shows an example where FEC on/off field 1316 is "1" and FT field 915 is "0 for a frame type 1300A. Frame type 1300A is substantially similar to frame type 1000 (FIG. 10). FIG. 13B shows an example where FEC on/off field 1316 is "1" and FT field 915 is "1" for a frame type 1300B. Frame type 1300B is substantially similar to frame type 1100 (FIG. 11). In other embodiments, different frame types can be used when FEC is turned off.

As in previously described OTU frame types, OPU overhead field 917 is used to indicate the type of payload of the current OTU frame. As in the previously described OTU frame types, OPU overhead field 917 can be used to indicate the type of data stored in the freed FEC portion as well as the payload portion.

When the FEC function is turned off, the data in what was the FEC portion can be used to include PBS information. If the FEC feature is turned off and the FEC portion is not needed for other uses, the FEC portion can include dummy data. For example, the FEC portion can include all zeros, which, according to the G.709 standard, the receiving device is configured to recognize as indicating that the FEC feature is not being used.

Figure 14:
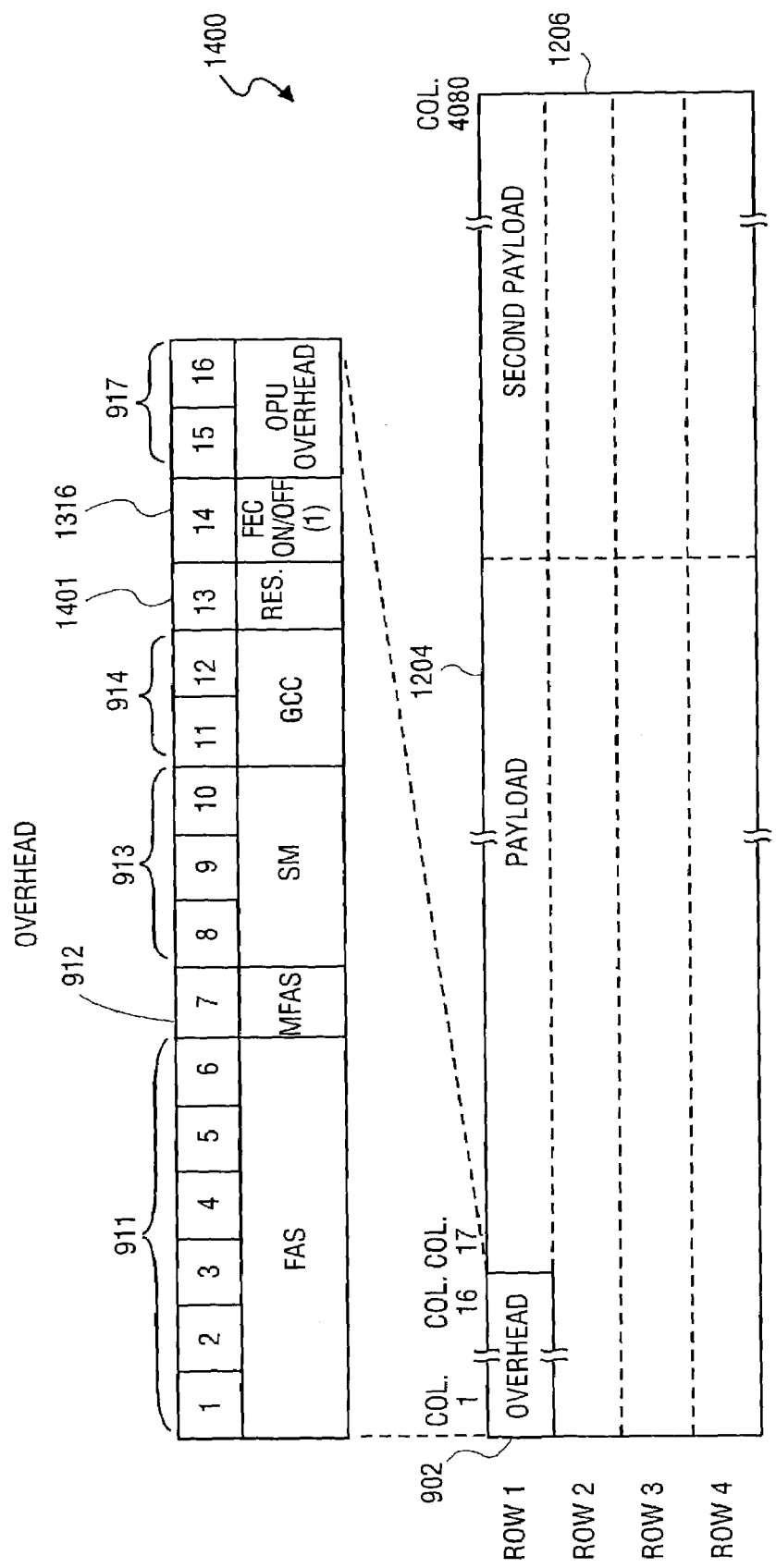
FIG. 14 is a diagram illustrating an optical channel transport unit (OTU) frame according to the ITU-T Recommendation G.709 standard, which has been modified to include different frame types and different types of optical payloads according to yet another embodiment of the present invention.

FIG. 14 illustrates an embodiment of yet another alternative frame type in which only a single frame type 1400 is used when the FEC feature is turned off. In this embodiment, because only one type of frame type is possible if FEC is turned off, the FT field can be omitted. For example, as shown in FIG. 14, column 13 is labeled as reserved field 1401. Thus, when the FEC feature is turned on (i.e., FEC on/off field 1316 is "0"), the frame type substantially similar to that shown in FIG. 13 (except that the FT field is omitted). Conversely, when the FEC feature is turned off (i.e., FEC on/off field 1316 is "1", the frame type can be a preselected frame type as shown in either FIGS. 10-12, or some other suitable frame type. The exemplary frame shown in FIG. 14 is one in which FEC is turned off and the frame type is as shown in FIG. 12.

Embodiments of method and apparatus for implementing a PBS network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

Thus, embodiments of this invention may be used as or to support software program executed upon some form of processing core (such as the CPU of a computer or a processor of a module) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. A system comprising:
 an optical channel transport unit (OTU) framer to frame information of an optical burst including an optical burst format into an OTU frame, the OTU frame including an overhead portion, a payload portion and a error correction portion, wherein the overhead portion includes a first field to indicate whether the OTU frame was encoded with error correction coding and a second field to indicate a type of data carried in the error correction portion when the first field indicates that the OTU frame was encoded without error correction coding, wherein the second field further indicates whether the type of data carried in the error correction portion is different from a type of data carried in the payload portion when the OTU frame is encoded without error correction coding; and
 an optical interface to transmit the OTU frame to a node of an optical network, the node comprising an optical switch.

2. The system of claim 1 wherein the optical network comprises a wavelength division multiplexed (WDM) network.

3. The system of claim 1 wherein the payload and error correction portions conform with ITU-T Recommendation G.709 when the first field indicates that the OTU frame was encoded with error correction coding.

4. The system of claim 1 wherein the framer is further to selectively frame the payload portion and the error correction portion as a single extended payload portion in response to the first field including information indicating that the OTU frame was not encoded with error correction coding.

5. The system of claim 4 wherein the extended payload portion includes only one type of optical burst.

6. The system of claim 4 wherein the extended payload portion includes an optical control burst according to the optical burst format and an optical data burst according to the optical burst format.

7. The system of claim 1 wherein the framer is further to selectively frame the error correction portion as a second payload portion to include data related to the optical network in response to the first field including information indicating that the OTU frame was not encoded with error correction coding.

8. The system of claim 7 wherein the payload portion includes an optical data burst according to the optical burst format and the data related to the optical network comprises an optical control burst according to the optical burst format.

9. The system of claim 7 wherein the payload portion includes an optical data burst according to the optical burst format and the data related to the optical network comprises optical network management burst according to the optical burst format.

10. The system of claim 7 wherein the payload portion includes an optical data burst and the data related to the optical network comprises data that is not specified in the optical burst format.

11. The system of claim 10 wherein the data related to the optical network comprises metadata.

12. The system of claim 2 wherein the optical WDM network comprises a photonic burst switched (PBS) network.

13. The system of claim 1 wherein the second field further indicates whether the payload portion includes a data burst, a control burst, metadata or a combination thereof.

14. The system of claim 1 wherein the optical burst includes a control burst, a data burst or a network management burst.

15. The system of claim 13 wherein the node is to selectively configure the optical switch in response to the optical burst comprising the control burst.

16. The system of claim 15 wherein the optical switch of the node is to selectively optically switch the optical burst in response to the optical burst comprising a data burst, and wherein the optical switch being selectively configured in response to a previously received optical control burst.

17. The system of claim 1 wherein the overhead portion includes a third field to indicate whether the OTU frame includes an extended payload portion formed from the payload portion and the error correction portion, or includes a second payload portion formed from the error correction portion.

18. A method comprising:
framing information to be transmitted over an optical network into an optical burst according to an optical burst format;
framing information of the optical burst into an optical channel transport unit (OTU) frame including an OTU frame format, the OTU frame format comprising an overhead portion, a payload portion and an error correction portion, wherein the overhead portion includes a first field to indicate whether the OTU frame was encoded with error correction coding and a second field to indicate a type of data carried in the error correction portion when the first field indicates that the OTU frame was encoded without error correction coding, wherein the second field further indicates whether the type of data carried in the error correction portion is different from a type of data carried in the payload portion when the OTU frame is encoded without error correction coding; and
transmitting the OTU frame to a node of the optical network, the node comprising an optical switch.

19. The method of claim 18 wherein the optical network comprises a wavelength division multiplexed (WDM) network.

20. The method of claim 18 wherein framing information of the optical burst further comprises selectively framing the payload and error correction portions to conform with ITU-T Recommendation G.709 in response to the first field including information indicating that the OTU frame was encoded with error correction coding.

21. The method of claim 18 wherein framing information of the optical burst further comprises selectively framing the payload portion and the error correction portion as a single extended payload portion in response to the first field including information indicating that the OTU frame was not encoded with error correction coding.

22. The method of claim 21 wherein the extended payload portion includes only one type of optical burst.

23. The method of claim 21 wherein the extended payload portion includes an optical control burst according to the optical burst format and an optical data burst according to the optical burst format.

24. The method of claim 18 wherein framing information of the optical burst further comprises selectively framing the error correction portion as a second payload portion to include data related to the optical network in response to the first field including information indicating that the OTU frame was not encoded with error correction coding.

25. The method of claim 24 wherein the payload portion includes an optical data burst according to the optical burst format and the data related to the optical network comprises an optical control burst according to the optical burst format.

26. The method of claim 24 wherein the payload portion includes an optical data burst according to the optical burst format and the data related to the optical network comprises an optical network management burst according to the optical burst format.

27. The method of claim 24 wherein the payload portion includes an optical data burst and the data related to the optical network comprises data that is not specified in the optical burst format.

28. The method of claim 27 wherein the data related to the optical network comprises metadata.

29. The method of claim 19 wherein the optical WDM network comprises a photonic burst switched (PBS) network.

30. The method of claim 18 wherein the optical burst comprises a control burst, a data burst, or a management burst.

31. The method of claim 30 wherein the node selectively configures the optical switch in response to the optical burst comprising a control burst.

32. The method of claim 31 wherein the optical switch of the node selectively optically switches the optical burst in response to the optical burst comprising a data burst, and wherein the optical switch being selectively configured in response to a previously received optical control burst.

33. The method of claim 18 wherein the second field further indicates whether the payload portion includes a data burst, a control burst, metadata or a combination thereof.

34. The method of claim 18 wherein the overhead portion includes a third field to indicate whether the OTU frame includes an extended payload portion formed from the payload portion and the error correction portion, or whether the OTU frame includes a second payload portion fanned from the error correction portion.

35. A system, comprising:
a plurality of optically interconnected switching nodes each including an optical switch; and
an edge node, comprising:
an optical burst framer to frame information received from a first network into an optical burst according to an optical burst format;
an optical channel transport unit (OTU) framer to frame information of the optical burst into an OTU frame according to a preselected OTU format, the OTU frame including an overhead portion, a payload portion and a error correction portion, wherein the overhead portion includes a first field to indicate whether the OTU frame was encoded with error correction coding and a second field to indicate a type of data carried in the error correction portion when the first field indicates that the OTU frame was encoded without error correction coding, wherein the second field further indicates whether the type of data carried in the error correction portion is different from a type of data carried in the payload portion when the OTU frame is encoded without error correction coding; and
an optical interface to transmit the OTU frame to a switching node of the plurality of switching nodes.

36. The system of claim 35 wherein the optical network comprises a wavelength division multiplexed (WDM) network.

37. The system of claim 35 wherein the framer is further to selectively frame the payload and error correction portions to conform with ITU-T Recommendation G.709 in response to the first field including information indicating that the OTU frame was encoded with error correction coding.

38. The system of claim 35 wherein the framer is further to selectively frame the payload portion and the error correction portion as a single extended payload portion in response to the first field indicating that the OTU frame was not encoded with error correction coding.

39. The system of claim 38 wherein the extended payload portion includes only one type of optical burst.

40. The system of claim 38 wherein the extended payload portion includes an optical control burst according to the optical burst format and an optical data burst according to the optical burst format.

41. The system of claim 35 wherein the framer is further to selectively frame the error correction portion as a second payload portion to transport data related to the optical network in response to the first field including information indicating that the OTU frame was not encoded with error correction coding.

42. The system of claim 41 wherein the payload portion includes an optical data burst according to the optical burst format and the data related to the optical network comprises an optical control burst according to the optical burst format.

43. The system of claim 41 wherein the payload portion includes an optical data burst according to the optical burst format and the data related to the optical network comprises an optical network management burst according to the optical burst format.

44. The system of claim 41 wherein the payload portion includes an optical data burst according to the optical burst format and the data related to the optical network is data that is not specified in the optical burst format.

45. The system of claim 44 wherein the data related to the optical network comprises metadata.

46. The system of claim 36 wherein the optical WDM network comprises a photonic burst switched (PBS) network.

47. The system of claim 35 wherein the optical burst comprises a control burst, a data burst, or a management burst.

48. The system of claim 47 wherein the node is to selectively configure the optical switch in response to the optical burst comprising a control burst.

49. The system of claim 48 wherein the optical switch of the node is to selectively optically switch the optical burst in response to the optical burst comprising a data burst, the optical switch being selectively configured in response to a previously received optical control burst.

50. The system of claim 35 wherein the second field further indicates whether the payload portion includes a data burst, a control burst, metadata, or a combination thereof.

51. The system of claim 35 wherein the overhead portion includes a third field to indicate whether the OTU frame includes an extended payload portion formed from the payload portion and the error correction portion, or includes a second payload portion formed from the error correction portion.

52. The system of claim 1 wherein the OTU frame includes a preselected number of rows and a preselected number of columns.

53. The method of claim 18 wherein the OTU frame includes a preselected number of rows and a preselected number of columns.

54. The system of claim 35 wherein the OTU frame includes a preselected number of rows and a preselected number of columns.

55. The system of claim 1, wherein the first field and the second field comprise a single multi-bit field.

56. The method of claim 18, wherein the first field and the second field comprise a single multi-bit field.

\* \* \* \* \*

UNITED STATES PATENT AND TRADEMARK OFFICE
CERTIFICATE OF CORRECTION

PATENT NO.       : 7,526,202 B2
APPLICATION NO.  : 10/441771
DATED            : April 28, 2009
INVENTOR(S)      : Ovadia et al.

It is certified that error appears in the above-identified patent and that said Letters Patent is hereby corrected as shown below:

In column 21, at line 8, delete, "fanned" and insert --formed--.

Signed and Sealed this

Ninth Day of November, 2010

David J. Kappos
*Director of the United States Patent and Trademark Office*